United States Patent

[11] 3,569,938

[72] Inventors Harold E. Eden;
John J. Harmon, San Jose, Calif.
[21] Appl. No. 692,007
[22] Filed Dec. 20, 1967
[45] Patented Mar. 9, 1971
[73] Assignee International Business Machines Corporation
Armonk, N.Y.

[54] STORAGE MANAGER
19 Claims, 11 Drawing Figs.

[52] U.S. Cl. .......... 340/172.5
[51] Int. Cl. .......... G06f 9/20
[50] Field of Search .......... 340/172.5; 235/157

[56] References Cited
UNITED STATES PATENTS

| | | | |
|---|---|---|---|
| 3,323,108 | 5/1967 | Mullery et al. | 340/172.5 |
| 3,292,153 | 12/1966 | Barton et al. | 340/172.5 |
| 3,394,353 | 7/1968 | Bloom et al. | 340/172.5 |
| 3,387,272 | 6/1968 | Evans et al. | 340/172.5 |
| 3,487,373 | 12/1969 | Barlow et al. | 340/172.5 |
| 3,505,647 | 4/1970 | Torfeh et al. | 340/172.5 |

*Primary Examiner*—Raulfe B. Zache
*Attorneys*—Hanifin and Jancin and John H. Holcombe ABSTRACT: In a data processing system wherein data is stored in a large capacity bulk storage, and is processed against from a low capacity, high speed storage, a storage manager for accepting addresses from said data processing system in terms of the normal addressing capability of said system, and automatically retrieving the required data block from bulk storage to high speed storage for system processing, said storage manager comprising first means for receiving a data block address, and translating said address into a physical address for accessing said high speed storage, if said block address is presently being, or has recently been, processed against; second means for scanning said block addresses present in said high speed storage means and presenting the physical addresses of said data block for high speed storage access if said data block is resident in said high speed storage means; third means useable in the eventuality that the desired data block is not resident in said high speed storage, for designating data storage areas in said high speed storage to receive said required data block from said bulk storage; fourth means, including bulk storage accessing means, for retrieving or inserting said required data block from or into said bulk storage to or from said high speed storage; and fifth means for setting up control information and presenting said control information to said fourth means for supervising said retrieval or insertion of said data.

INVENTORS.
HAROLD E. EDEN
JOHN J. HARMON

BY Peter R. Leal
AGENT

Patented March 9, 1971 3,569,938

7 Sheets-Sheet 4

STORAGE MANAGER

BACKGROUND OF THE INVENTION

In modern day data processing systems, many blocks of code or data are moved successively from external, large capacity, bulk storage devices, such as disc storage, into high speed storage (HSS) such as core storage, from whence said data blocks are processed against by the central processing unit (CPU) of the data processing system. Processing is continued against these data blocks in HSS for time, and then said data blocks are moved out to be replaced by new data blocks as the processing program demands.

However, to preserve the quality of the immediate access of data while maintaining efficient useage of the processing system requires an excessive amount of software, which tends to be self-defeating.

The present invention provides a storage manager for dynamic allocation and relocation of data blocks from bulk storage to HSS, which allows the CPU always to execute against HSS. As long as the desired instructions or data for a given program are in HSS, the programs will execute. However, when this is not the case, the CPU receives an interrupt signal from the storage manager which allows it to switch to another program, or simply wait. During the interim, the storage manager will automatically retrieve the required data block from bulk storage and place it in the HSS, then signal the CPU that the move is complete and the desired data can be processed against. With this storage manager approach, the physical bounds of the HSS cease to have any real significance to the programmer. Although usually written and executed as a set of continuous instructions and working space, the data processing program and data may now exist in the system as scattered blocks. Since this is the case, the programmer does not concern himself with the real HSS but simply with the apparent store — that is, the storage encompassed by the addressing range of the machine.

Accordingly, it is the general object of this invention to achieve an improved data storage system control.

It is a further object of this invention to achieve data storage system control which increases the overall throughput of a data processing system by providing for automatic movement of data blocks through the system.

It is a further object of this invention to achieve a system wherein the programmer need not concern himself with the actual storage limitations of the system.

The foregoing and other objects, features, and advantages of the invention will be apparent from the following more particular description of the embodiment of the invention as illustrated in the accompanying drawing.

Figure 7:
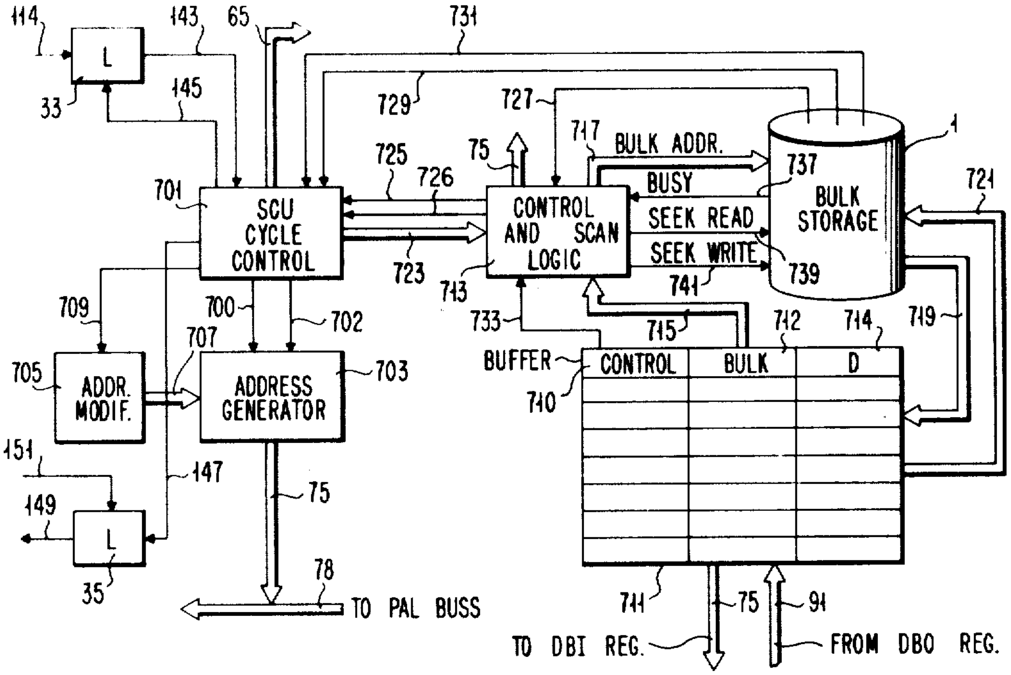

FIG. 7 s is a representation of the Storage Control portion of the storage manager.

Figure 7A:
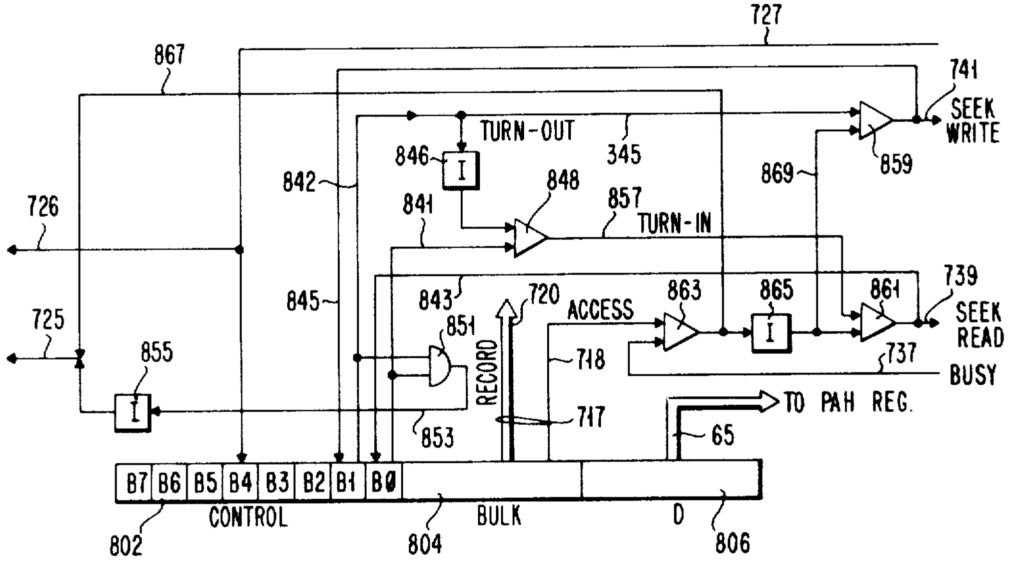

FIG. 7A is a representation of the control and scan logic seen generally in FIG. 7.

BROAD DESCRIPTION OF STRUCTURE AND OPERATION

Concept of Apparent Store

As used in this application, apparent store (AS) means the number of blocks of stored data encompassed by the normal addressing capability of a digital computing machine. For example, a machine with a 24 bit wide address structure broken down into a 12 bit high order portion and a 12 bit low order portion, can encompass $2^{12}$ blocks of data, each block containing $2^{12}$ bytes of data, where a byte is defined, for example, as an 8 bit data word.

Figure 1:
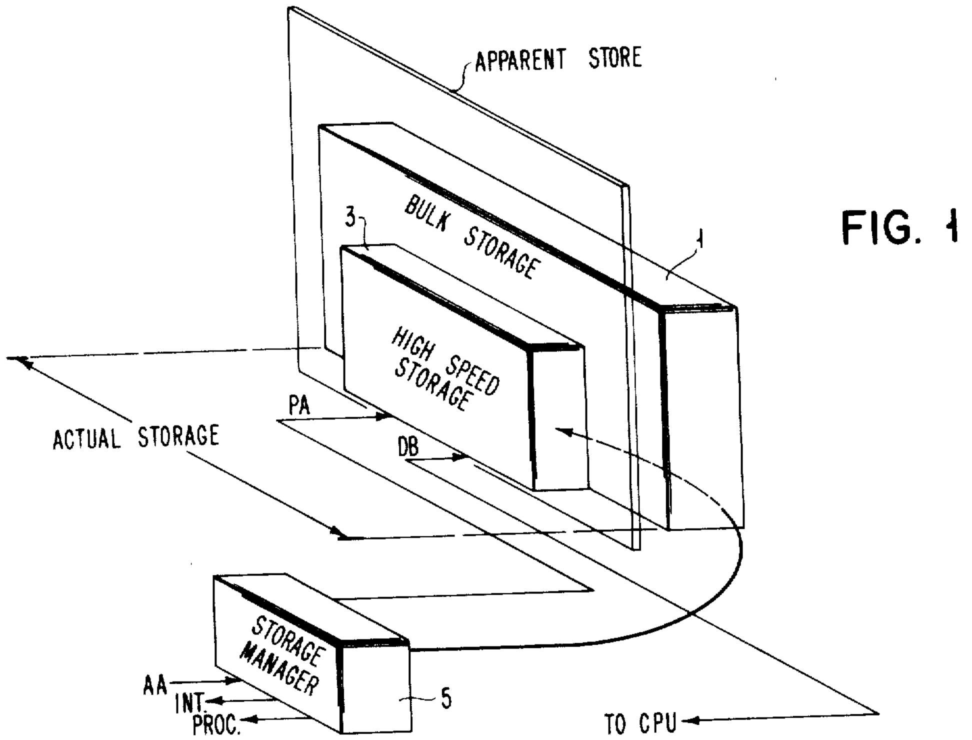
FIG. 1 is an illustration of the concepts of storage manager, virtual store and apparent store.

The concept of apparent store is seen in FIG. 1. FIG. 1 illustrates the actual store of information in the data processing system comprising one or more CPU's. Bulk storage 1 may be any suitable type large capacity storage such as a drum storage, disc storage, or the like. It is this bulk storage which will store the data which appears to the programmer to be located in the apparent store. High speed storage (HSS) 3, which may be core or other suitable storage, is the high speed section of the storage system and it is against this HSS which a CPU processes.

In general operation, the CPU program, in order to fetch or store a particular piece of data, issues an apparent address (AA) to the storage manager 5, in FIG. 1. This AA may be, for example, 24 bits wide and contain 12 high order bits (AAH) and 12 low order bits (AAL). To the issuing CPU, all data appears to be located in HSS which appears to be encompassed by the addressing capability of the machine. However, in reality, HSS contains only a portion of the data represented by the full addressing capability of the machine. The rest of the data is located in bulk storage 1.

HSS is divided into storage areas, each capable of storing one block of data. This is seen diagrammatically in FIG. 6A. Each address area, or block, of HSS has a physical address (PA) divided into high and low order portions, PAH and PAL, respectively. A block contains a number of bytes of data. The PAH portion of the PA addresses to the block, and the PAL portion of the PA addresses to the desired data byte within a block, within HSS.

In general operation, the CPU program issues an AA to the Storage Manager 5 over the AA line. The Storage Manager determines whether or not the addressed data is actually in HSS 3. If the data is in HSS 3, the Storage Manager issues the PA of the data block directly over the PA line to access HSS. The data desired is then transferred to the CPU over data buss DB.

In the eventuality that the Storage Manager determines the data represented by AA not to be in HSS, the Storage Manager issues an interrupt, over the INT line, to the CPU. This interrupt signals the CPU to switch to another program, if the CPU is is operative in a multiprogram environment, or simply to wait. At this point, the Storage Manager must locate the desired data in bulk storage and transfer it to HSS. This can entail a multistep process.

A. If the HSS presently has a vacant core block, that core block is designated to receive the desired data from bulk storage. This is termed Allocation. Thereafter, the Storage Manager locates the desired block of data in bulk storage and transfers it to the allocated block in HSS for subsequent access and processing.

B. If the HSS presently does not have a vacant core block, a specified occupied core block is designated and the data in the designated core block is transferred to bulk storage. This is termed Reallocation. After reallocation, the above-mentioned designated core block is used for allocation, and the desired data, originally indicated by the AA, is retrieved from bulk storage and transferred to the allocated core block in HSS for subsequent access and processing.

Before proceeding to a more detailed explanation of the structure and operation of the invention, the following is a Table of Abbreviations used in describing the invention, and a Glossary of Terms used in describing the invention.

TABLE OF ABBREVIATIONS

AA — Apparent Address
AAH — High Order Portion of Apparent Address
AAL — Low Order Portion of Apparent Address
AS — Apparent Store
CBC — Core Block Controller
CPU — Central Processing Unit
HSS — High Speed Store
IA — Immediate Access
IR — Immediate Reference
PA — Physical Address
PAL — Low Order Portion of Physical Address
PAH — High Order Portion of Physical Address
PTM — Page Turn Monitor
SCU — Storage Control Unit

GLOSSARY OF TERMS

Apparent Address — A symbolic name, representative of a block of data somewhere in apparent store. It is divided into two portions, a low order portion (AAL) and a high order portion (AAH).

Apparent Address High (AAH) — The high order portion of the Apparent Address. This portion addresses to a particular data block within the apparent store.

Apparent Address Low (AAL) — The low order portion of the Apparent Address. This portion addresses to an individual byte of data within a data block. Apparent Store — The storage that can be addressed by the normal addressing capability of the data processing machine.

Core Block — An addressable area of High Speed Storage which contains a given number of bytes of data. When the desired data is actually in this area of High Speed Storage, it is called a core block of data. If the desired data is not in High Speed Storage but rather is in bulk storage, it is called a page of data.

Core Block Allocation — Designation of a vacant core block in High Speed Store to receive a page of data corresponding to the data.

Core Block Controller — That part of the Storage Manager which controls core block allocation or reallocation.

High Speed Store — The high speed portion of the actual storage which a data processing system has on line. The CPU processes against data located in High Speed Store. If the data designated by the issued Apparent Address is not in High Speed Store, the Storage Manager will locate it in bulk storage and place it in High Speed Store for processing.

Immediate Access — That subsystem of the Storage Manager which determines if the issued Apparent Address is the last, or one of the most recent block addresses processed against.

Immediate Reference — That subsystem of the Storage Manager which, in the eventuality that the Apparent Address was not one of the last or more recent block addresses processed against, determines whether the data designated by the Apparent Address is located in any core block in the High Speed Store.

Page Turn Controller — That subsystem of the Storage Manager which controls the retrieval of data from bulk storage, by way of the storage control unit subsystem of the Storage Manager.

Page Turning — The process of turning in a page of data from bulk storage into the high speed store, or of turning out a block of data from high speed store to bulk storage, under control of the Storage Manager.

Physical Address — A translation of the Apparent Address to the actual address of the desired core block in High Speed Store.

Pointer — A control word which indicates, or "points" to, a data location.

Storage Control Unit — That subsystem of the Storage Manager which inserts and retrieves pages of data to or from bulk storage.

GENERAL DESCRIPTION

Figure 2:
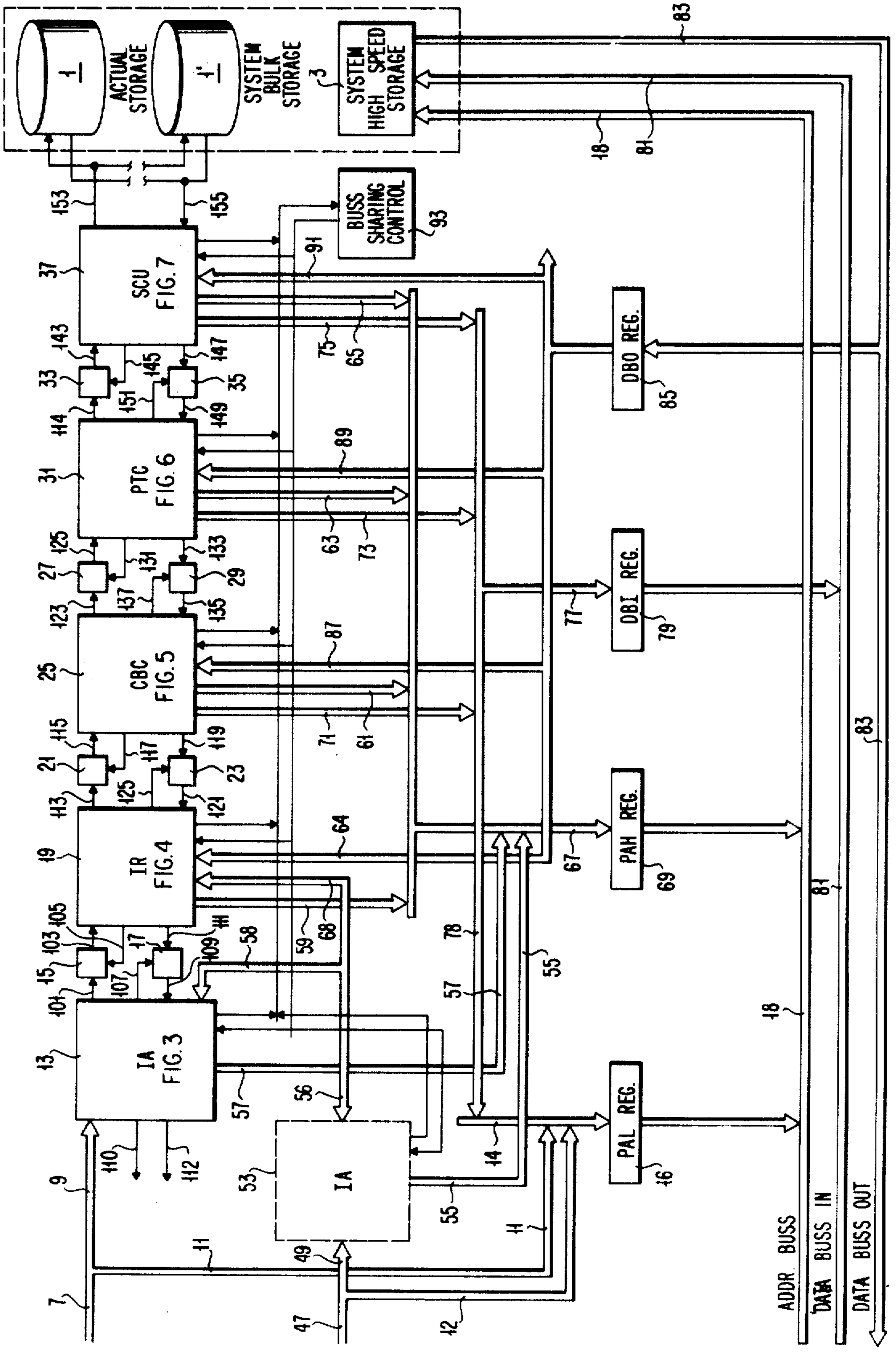
FIG. 2 is a block diagram of a representation of the storage manager of the present invention.

A block diagram of the Storage Manager is seen generally in FIG. 2. The Storage Manager can work in conjunction with one or several CPU's. As seen in FIG. 2, AA buss 7 is the apparent address buss which receives an apparent address from a given CPU. AA buss 7 is divided, by suitable gating means well known in the art but not shown here, in order to preserve clarity of drawing, into the AAH buss 9 and AAL buss 11, for receiving the high and low portions of the address, respectively. The actual storage which the data processing system actually has on line is seen as including both system bulk storage 1, 1' and system high speed storage 3. System bulk storage 1, 1' is illustrated as comprising drum storage devices, but any well known storage devices such as discs, or tapes, or the like can be used. System high speed storage 3 can be core storage or any other suitable high speed storage. In general, system high speed storage 3 is the high speed portion of the actual storage on the line, and it is against this high speed portion that a given CPU processes. The system bulk storage is a relatively large capacity storage which is generally slower in response than system high speed storage 3. System high speed storage 3 is divided into blocks of data, hereinafter referred to as core blocks. Each core block has a number of bytes of data. A given core block of data has a Physical Address (PA) comprising a high order portion (PAH) and a low order portion (PAL). PAH addresses to the core block itself while PAL addresses to a given byte within the addressed core block. As mentioned earlier, the AA is a symbolic address and ultimately becomes translated to the PA. However, only the high order portion part of the AA (AAH) is translated, the low order portion (AAL) is carried along undisturbed and ultimately becomes directly the PAL. It is the basic function of the Storage Manager to translate the AAH into the PAH in order that the PAH and PAL can thereafter access the desired data in system high speed storage. If the desired data is not in system high speed storage at the time the AA is issued, then the desired data is in system bulk storage and it is the duty of the Storage Manager to interrupt the issuing CPU, retrieve the desired data from system bulk storage, place the desired data in high speed storage, and reinterrupt the issuing CPU to inform it that the desired data is now in system high speed storage for processing.

Inasmuch as the Storage Manager is operative in a multiple CPU environment if desired, a second AA buss 47 is shown in the FIG. This second AA buss is divided into AAH buss 49 and AAL buss 12, in a manner similar to AA buss 7. It is to be noted that only two AA busses are shown for clarity. As many AA busses can be provided for the system as dictated by system requirements. Both AAL busses 11 and 12 are connected to PAL buss 14 which, in turn, is connected to PAL register 16. Thus, the low order portion of the apparent address directly becomes the low order portion of the physical address, addressing to the desired byte of the desired core block of data. PAL register 16 is connected directly to address buss 18. Address buss 18 is connected to high speed storage 3. AAH buss 9 is connected to Immediate Access (IA) subsystem 13. IA subsystem 13 will be described in detail hereinafter, but for the time being it can be considered that the IA is that portion of the Storage Manager which determines whether the issued AAH represents a block of data which is presently being processed against, or a block of data which has very recently been processed against. In that eventuality, buss 57 is provided which connects to PAH buss 67 which in turn connects to PAH Register 69. In the eventuality that the issued AAH represents a core block address which is presently being processed against or has very recently been processed against, the PAH will immediately be transferred via buss 57 to PAH register 69 via PAH buss 67 for an immediate access of system high speed storage over address buss 18 under control of the entire PA, including PAH from PAH register 69 and PAL from PAL register 16.

Immediate (IR) subsystem 19 is also provided. The IA is connected to the IR via communication lines 101, 103, by way of lockout latch 15 having conditioning line 105; and also by way of communication lines 111, 109 via lockout latch 17 having condition in line 107. IR 19 has buss 59 entering to PAH buss 67. The IR subsystem will be more fully described hereinafter. However, for the present, the IR subsystem can be considered as that portion of the Storage Manager which, in the eventuality that the issued AAH does not represent a core lines which is being, or has recently been, accessed will determine whether or not the core block is represented by the issued AAH is contained anywhere 31 is connected to system high speed storage 3. If the desired core block is in high speed store, buss IR will emit the PAH portion of the address over buss 59 to PAH register 69 via PAH buss 67. The desired data can be accessed over address buss 18 under control of the PAH and PAL registers 69 and 16 respectively. In the eventuality that the desired data block is not contained in system high speed storage, then it must be located in system bulk storage. It is the function of the Core Block Controller (CBC) subsystem 25, the Page Turn Controller of subsystem (PTC) and the Storage Control Unit subsystem (SCU) of the Storage Manager to locate the desired address in system bulk storage and to retrieve it therefrom to be placed in a vacant core block in system high speed storage 3 for subsequent processing. However, it may be that all high speed storage core blocks are filled and in use. If there is no vacant or unused core block in system high speed storage 3, the three last named subsystems will coact to select a specific least busy core block in system high speed storage, turn that core block of data out into system bulk storage, and turn in the page containing the data specified by the AAH from system bulk storage into the specified least busy (now vacant) core block of system high speed storage 3 for subsequent processing.

Core Block Controller (CBC) subsystem 25 is connected to IR subsystem 19 via communication lines 113, 115 including lockout latch 21 and conditioning line 117; and also communication line 119, 121 including lockout latch 23 and conditioning line 125. CBC 25 is connected to PAH buss 67 via buss 61. CBC is connected to a Data Buss In Register (DBI) 79 via busses 71 and 77. DBI register 79 is connected to Data Buss In 81. Data Buss In 81 therefore has entrance from the system bulk storage via the CBC, as well as an input from the CPU as indicated at the left hand extremity of DBI 81. Thus when entering information into system high speed storage from system bulk storage, or from Storage Manager subsystems, information will be entered into system high speed storage via DBI register 79, under control of the PA from PAH register 69 and PAL register 16, over Address Buss 18.

Data is emitted from system high speed storage 3 over Data Buss Out (DBO) 83 either directly to the accessing CPU as indicated at the left extremity of DBO 83, or to various Storage Manager subsystems via Data Buss Out (DBO) register 85. DBO register 85 is connected to IR 19 via buss 64, to CBC 25 via buss 87, to PTC 31 via buss 89, and to SCU via buss 91.

The Storage Manager also contains a Page Turn Controller (PTC) subsystem 31. PTC 31 is connected to CBC 25 via communication lines 123, 125, including lockout latch 27 and conditioning line 131; and by communication lines 133, 135, including lockout latch 29 and conditioning line 137. PTC 31 is connected to PAH buss 67 via buss 63, and is also connected to DBI register 79 via buss 73 and buss 77. DBO register 85 is connected to PTC 31 via buss 89. PTC 31 will be described in detail hereinafter, but for the present PTC 31 can be considered as that portion of the Storage Manager which sets up control information for the Storage Control Unit (SCU) subsystem from which the SCU can retrieve or store the desired data from or to the system bulk storage for ultimate transfer to or from system high speed storage.

Also included is SCU 37 which is a storage control unit for retrieving data from and transferring data to system bulk storage 1, 1'. SCU 37 is connected to PTC 31 via communication lines 141, 143 including lockout latch 33 and conditioning line 145; and communication lines 147, 149, including lockout latch 35 and conditioning line 151. SCU 37 is connected to system bulk storage 1, 1' via data lines 153, 155. SCU 37 is also connected to PAH buss 67 via buss 65, and to DBI register 79 via busses 75 and 77. DBO register 85 is also connected to SCU 37 via buss 91. SCU 37 will be described in more detail hereinafter, but for the present can be considered to be a storage control unit which transfers data to and retrieves data from system bulk storage 1, under control of PTC 31, for ultimate distribution to and from system high speed storage 3. Buss sharing control 93 is included to provide timing for the gating of the various busses and registers in the system.

It is to be noted that IA 53, shown in phantom, is a second Immediate Access provided for a second CPU connected over second AA buss 47. In general, there will be an Immediate Access subsystem for each CPU in the system. However, there will only be a single IR, CBC, PTC and SCU in the system regardless of the number of CPU's on line.

A general summary of operation will be given at this point. For a given CPU, an apparent address is issued over AA buss The lower portion of the AA proceeds over AAL buss IA to PAL buss 14 and then to PAL register 16. The high order portion of the AA proceeds along AAH buss 9 to the IA 13. If the core block designated by the AAH is presently being processed against, or has been very recently processed against, as will be made more clear in subsequent discussion, the AAH is immediately translated to the high order portion of the physical address, PAH, and is transmitted via buss 57 to PAH buss 67 and to PAH register 69. In this eventuality, system high speed storage 3 is accessed over address buss 18 under control of the PAH and PAL and the desired data is sent to the issuing CPU via DBO 83. In the eventuality that the issued AAH did not designate a core block which was presently being processed against, or which was very recently processed against, the IA interrupts the CPU and signals the IR. The IR 19 then makes a search of all core blocks located in system high speed storage 3 to determine whether or not the core block designated by AAH is present anywhere in system high speed storage, even though it is not the core block presently processed against, or one very recently processed against. If it is determined by the IR that the designated core block is present in system high speed storage, IR 19 translates the AAH into the high order portion of the physical address of the desired core block and transmits this via buss 59 to PAH buss 67 and then to PAH register 69. System high speed storage 3 is then accessed in the same manner as explained above.

In the eventuality that the core block designated by AAH is not anywhere in high speed system storage, it must then be in the system bulk storage 1, 1'. At this point the CPU is interrupt and the CBC comes into play. When the desired core block of data is in the system bulk storage it is termed a page. When the desired data block exists in system high speed storage it is termed a block. Once it is determined that the block does not exist in system high speed storage, the desired page of data must be turned in from system bulk storage to system high speed storage. This is termed page turn-in. However, before page turn-in can occur, a vacant core block in system high speed storage must be designated to receive the pages of data from system bulk storage. This is termed allocation of a core block to receive a page of data from system bulk storage. This is a function of the CBC subsystem. The CBC subsystem scans all core blocks in system high speed storage 3 and designates a vacant core block. The address of this core block is provided to PTC along with other control information to enable the PTC to set up control information for retrieval of the page of data from the system bulk storage via the SCU 37. In the eventuality there is no vacant core block in high speed storage 3, a specified least busy core block from system high speed storage 3 must be turned out to bulk storage via DBO 83 and DBO register 85 over buss 91 via the SCU to the system bulk storage. This process is called page turnout. The core block in system high speed storage from which page turnout occurred is now vacant. This process of turning out a core block of data is termed reallocation, and the vacant core block is now designated to receive the page of data indicated by AAH from system bulk storage. The page of data will be retrieved from system bulk storage by SCU 37 after PTC 31 has set up control information to supervise the transfer of data from SCU 37. This data will come over buss 75, and buss 77, to DBI register 79 wherein it will be entered into system high speed storage 3 via DBI 81, in the core block designated by the PA in PAH register 69 and PAL register 16, by accessing over Address Buss 18. The desired data designated by the AAH is now in high speed store 3. The CPU is again interrupted at this point as a signal to reissue the AAH to obtain the desired data.

DETAILED DESCRIPTION

System High Speed Storage Organization

System high speed storage, see generally at 3 in FIG. 2, comprises well known core storage, or the like. This core storage is organized into core blocks. In the present example a machine addressing capability of 24 bits is assumed, for purpose of illustration only. These 24 addressing bits are broken into 12 high order addressing bits and 12 low order addressing bits. The high speed storage is broken up into core blocks. Corresponding to the addressing scheme of the machine, there is a maximum of $2^{12}$ core blocks, each containing $2^{12}$ bytes of data. However, due to the cost of high speed storage, less than the maximum possible core blocks of data are used. For the present system, it is assumed that only 32 core blocks out of the possible $2^{12}$ core blocks are used, the remaining high order addressing capability representing pages of data in system bulk storage. Thus, for the present system there are 32 core blocks of data, each core block containing $2^{12}$ bytes. However, the programmer will address the high speed storage as if it did contain $2^{12}$ core blocks, each core block containing $2^{12}$ bytes of data. It is the function of the Storage Manager to determine whether or not the block of data represented by the high order portion of the address is in system high speed storage or in bulk storage. If it is in system high speed storage, the data is immediately provided. If it is in bulk storage, the Storage Manager retrieves the data for subsequent processing by the processor. Hence, from an addressing point of view, the high order 12 bits of the issued apparent address addresses to the core block of data while the low order 12 bits addresses to the byte of data within a core block.

As mentioned above, it is assumed for the present illustration that there are only 32 core blocks of $2^{12}$ data bytes each. One of these core blocks, core block zero of FIG. 6A, will be reserved for a storage and working area for the Storage Manager. This core block will hereinafter be referred to as Convention Core. As will become more clear hereafter, Convention Core will be used to store the contents of the control registers, discussed under the section entitled Immediate Reference Subsystems Structure. It will also be used to store control information for supervising page turn-in and page turnout. This control information will be hereinafter referred to as the Control Segment and will be discussed in the Page Turn Controller and Storage Control Unit sections of this application. As seen in FIG. 6A, there is a control segment in Convention Core (core block zero) for each core block in the system high speed store.

Immediate Access Subsystem Structure

Figure 3:
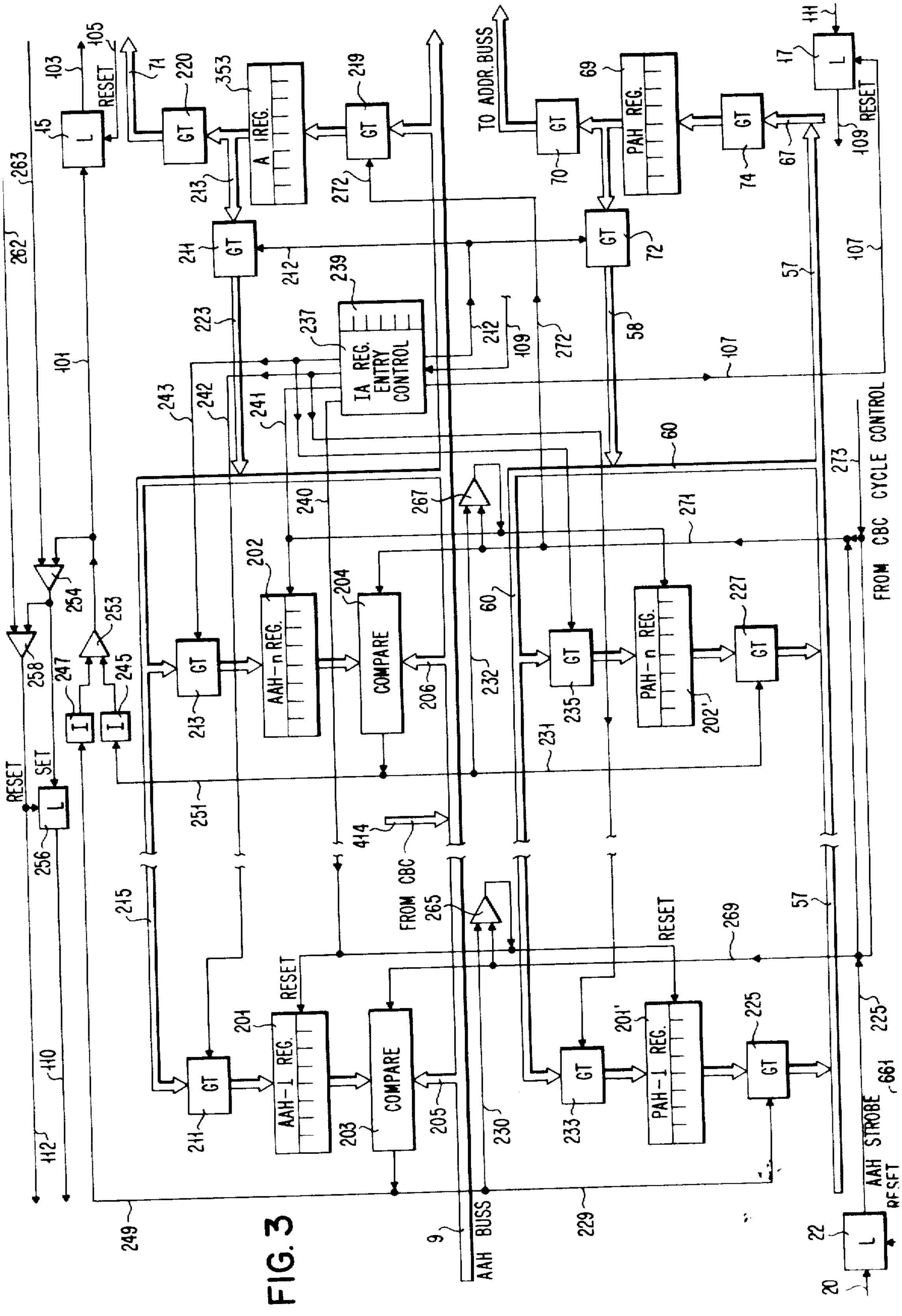
FIG. 3 is a detailed representation of the Immediate Access portion of the storage manager.

The immediate access subsystem comprises a comparison subsystem and is seen in FIG. 3. As seen in FIG. 3, the immediate access contains a number of register pairs AAH–1, PAH–1, ... AAH–n, PAH–n. There may be any number of these register pairs dependent upon the balance of cost and speed required for the system. Although only two register pairs are shown, this is merely for ease of illustration and the immediate access is not limited thereto. Each AAH–PAH register pair will contain the high order portion of an AA and of a PA translation, respectively. The contents of each AAH register represent AA's which have been recently processed against, such that if the AAH presented to the IA is one of these AA's which has been processed against the system will receive an immediate access to the data with extremely small delay. Entry of addresses into the register pairs will be subsequently described.

In FIG. 3, register 201 is connected to a comparison means 203 which may be, for example, any associative type comparison means well known to those skilled in the art. Address buss 9 has entry 205 to comparison means 203. Likewise register 202 is connected to comparison means 204 and address buss 9 has entry 206 to comparison means 204. Entry into registers 201, 202 is by means of gates 211, 213. AAH buss 9 has an extension 215 having entries to gates 211, 213. Also illustrated in the FIG. is A1 register 353. A1 register 353 is technically not part of the IA, but rather is part of the IR. However, it is illustrated in FIG. 3 for ease of understanding the relationship between the IR and IA. Entry is made to the A1 register 353 over address buss 9 via gate 219. One exit from the A1 register 353 is via gate 221 over buss 223 which has an entrance onto AAH buss extension 215 to enter an AAH into one of the registers 201, 202.

Buss 57 is an entrance buss into the PAH buss 67. Registers 201', 202' have entries to buss 57 via gates 225, 227. Gating of data from registers 201', 202' is controlled over enabling lines 229, 231 by means of a signal which appears upon equal comparison from comparing means 203, 204. Buss 57 has an extension 60 connected to gates 233, 235 for entry of data into registers 201', 202'. Also shown in FIG. 3 is PAH buss 67 and PAH register 69, previously illustrated in FIG. 2. These latter two elements along with their associated gating are technically not part of the IA but are included for clarity. PAH buss 67, as seen from both FIGS. 2 and 3 is connected to PAH register 69, explained previously. PAH register 69 is connected via gate 70 to address buss 18. It is also connected via gate 72 to buss 58 which has an entry to extension 60 of buss 57 for entering a PAH into registers 201', 202' via gates 233, 235. Buss 414 is an entry to AAH buss 9, from the CBC. The use of this buss will be explained in detail subsequently.

As the explanation of operation of the IA will subsequently reveal, it will be necessary to enter an AAH and its PAH translation into a register pair 201, 201', .. 202, 202'. This is performed under the control of the IA Register Entry Control 237. IA Register Entry Control 237 includes a ring 239. Ring 239 may be any ring well known in the computer art, such as one of the rings explained in detail in the book "Arithmetic Operations In Digital Computers" by R. J. Richards, D. Van Nostrand Co., Inc., Princeton, N.J., 1955, at pages 205—8. The ring 239 in control 237 controls data entry into, and reset of, the register pairs 201, 201',..., 202, 202' into which AAH and PAH will be entered. This is done by stepping the ring successively so that enabling signals over line 243 will enable gating via gates 213 and 235 and enabling signal over line 242 will enable gating over gates 211, 233.

The output from each compare means 203, 204 is connected to inverter means 245, 247. Each inverter means is connected respectively over lines 249, 251 to AND gate 253. As will be explained in the operation of the IA, simultaneous signals over line 249, 251 will indicate a lack of comparison of the incoming AAH over buss 9 with the AAH's in each register 201, 202, and this noncomparison signal will appear via gate 253 over line 101 to set latch 15, which will transmit a signal over line 103 to indicate to the IR that it is to be brought into play. Line 255 is connected to comparison means 203, 240 via lines 269, 271. Line 255 is connected also to gate 219 via line 272. A signal over line 255 indicates that the AAH is to be strobed for comparison with the AAH's in registers 201, 202, and that the AAH is also to be strobed into A1 register 353 via gate 219. Finally, a line 111, which proceeds from the IR is connected to latch 17. The signal over line 111 will set latch 17 to which is connected line 109. Line 109 is connected to IA Register Entry Control 239. A signal over line 109 will indicate that the AAH is the A1 register 353 and the PAH in the PAH register 69 should be gated to one of the register pairs 201, 201', ..., 202, 202', as indicated by the particular stage of ring 239 which is activated.

Immediate Access Subsystem Operation

A description of the operation of the AI subsystem should be given at this point. It will be remembered, as explained previously, that a programmer, when storing or fetching a particular piece of data is addressing in terms of the full addressing capability of the machine, even though this addressing capability is larger than the storage capability of the system high speed storage. Therefore, the programmer is addressing to an apparent store. However, as explained above, some of the data which the programmer desires may be in bulk storage and must be transferred from bulk storage to high speed storage. The programmer issues an apparent address over AA buss 7 on FIG. 2, the high order portion of which is gated, by well known gating means, to the AAH buss 9 shown in FIG. 2. This high order portion of the address addresses to the block level, while the lower order portion (AAL) addresses to the byte within a block. Therefore, it is very possible that the AAH is addressing to a core block which is presently being processed against by the same or another programmer; or that the AAH designates a core block which has recently been processed against in high speed storage. In the eventuality that the address indicated by AAH is the address of that data block presently being processed against in high speed store, or that it is one that has recently been processed against and is stored in the IA, the system will immediately access the desired data in high speed store. If the address indicated by the AAH is not one of the latter two described types, then the IR subsystem will come into play to determine whether or not the desired address is present anywhere in system high speed store.

IA Case 1— AAH Designates Recently Processed Data 1—

The IA provides the highest speed address translation level of the Storage Manager and comprises primarily a high speed register system. The most recently accessed block addresses are stored in the IA. It is to be noted that there is a separate IA subsystem for each CPU in the processing system. In the present example, it can be assumed that registers 201, 202 contain recently processed against AAH's and 201', 202' contain their translations to PAH's, respectively. As the AAH portion of the present instruction is presented to the IA via AAH buss 9 and gates to A1 register 353. It is also compared with the most recently processed against AAH's in registers 201, 202 by means of a broad-side comparison in compare means 203, 204, respectively. A successful match from either 201, 202 indicates that the presented AAH is either presently being processed against or has very recently been processed against. A comparison from one of the registers 201, 202 causes an enabling signal to be transmitted over lines 229 or 231 from comparison means 203, 204 to gate the respective PAH register of the register pair from registers 201' or 202' via gates 225 or 227, to be sent to the PAH register 69 via PAH buss 67. As can be seen from FIG. 2, the PAH register and the PAL register, which can be considered contiguous, now contain the total physical address with which to access system high speed storage 3. Accessing will occur by well known means and data will be on the DBI 81 if a store is being performed.

IA Case 2—Issued AAH Does Not Designate Recently Processed Data Block

If there is not successful comparison against any of these registers 201, ... 202, this means that the issued AAH has not been recently processed against. However, there is still a good possibility that the issued AAH designates a block address present in system high speed store somewhere, even though not recently processed against. In this situation the IR subsystem, to be explained later, is brought into play. For the present, the function of the IR subsystem can be considered to be similar to the function of the IA in obtaining a match and a resulting PAH. The nonsuccessful comparison against all registers 201, ... 202 yields a signal on each line 249, ... 251 and a signal over line 101 to indicate to the IR subsystem that it is to be activated. Assuming that the IR subsystem has determined that the desired core block is in high speed storage, that subsystem will enter the PAH of the core block in the PAH register 69, as will be explained later, and signal the IA over line 109 via latch 17 that the PAH is available. This signal on line 109 causes the ring 239 in IA Register Entry Control 237 to advance by one count and to gate the PAH from PAH register 69, and the AAH from A1 register 353, by gating line 212, to the register pair indicated by the activated line 242, 243. Recalling that the A1 register 353 contains the issued AAH, the signal over line 109 activates IA Register Entry Control 237 and the AAH from register 353 and the PAH from register 69 are gated into the appropriate register pair 201, 201', ..., 202, 202' as indicated by the activated one of the lines 242, 243 from ring 239 enabling the appropriate gates 211, 233 or 213, 235. The PAH portion of the address is now in the PAH register 69 and the PAL portion of the physical address is in PAL register 16 from whence system high speed store will be accessed by the address buss 18. As in the previous example, data will be on the DBI 81 if a store cycle is being performed or will be on the DBO 83 (FIG. 2) if a fetch is being performed. Since the IR has entered the AAH and PAH from registers 353 and 69, respectively into an appropriate register pair 201, 201', ..., 202, 202', if the AAH is subsequently addressed in the near future by the programmer, the access will be handled by the IA subsystem itself since it now has a record of this AAH in one of its register pairs. A subsequent IR cycle will not then be required. It is in this manner that the IA keeps a record of recently accessed AAH's and their respective PAH translations.

IA Case 3—Issued AAH Not In System High Speed Storage

In the eventuality that the IR subsystem determines that the issued AAH designates a page of data which is not in system high speed storage, the IR will signal the IA over line 263. Since the output of gate 253 is up, the IA will issue an interrupt signal via latch 256 over line 110 to its CPU. This interrupt signal is interpreted by the CPU to indicate that the CPU should branch to another program, or simply wait, until the desired data block, designated by the AAH, is available in high speed store. When the Storage Manager has moved the requested data block into high speed store, a signal will proceed over line 262 which will evoke a signal from a gate 258 to reset the interrupt on line 110 and result in a signal over line 112 to the CPU. This signal will be a "proceed" signal which will indicate to the CPU to present the issued AA again. At this point, the desired block of data is resident in high speed storage but is not yet in one of the register pairs of the IA. Therefore, when the CPU reissues the AA the first time, an IR reference will result, as explained in IA Case 2 above, and the desired data will be accessed, while the AAH and PAH portions of the Address will be inserted in an appropriate IA register pair. Once the AAH and PAH are inserted in the IA, a subsequent issue of the AA will result in IA Case 1 above.

Immediate Reference Subsystem Structure

The Immediate Reference (IR) subsystem provides fast access to a hardware map which contains the location of every data block that is resident in the high speed storage. There is normally only one IR in a system. Upon demand, the IR locates the address of a desired block and makes it available to the IA if it is in high speed storage, as explained in the previous section.

Figure 4A:
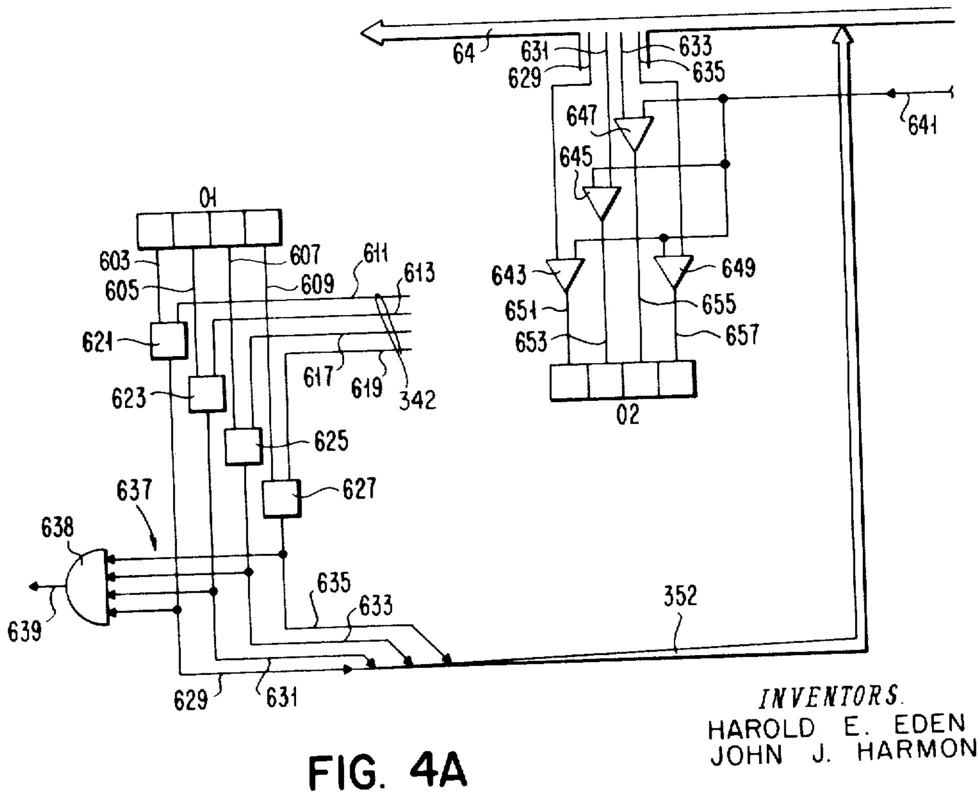
FIG. 4A is a representation of hardware suitable for use as the scan and set means seen generally in FIG. 4.
Figure 4:
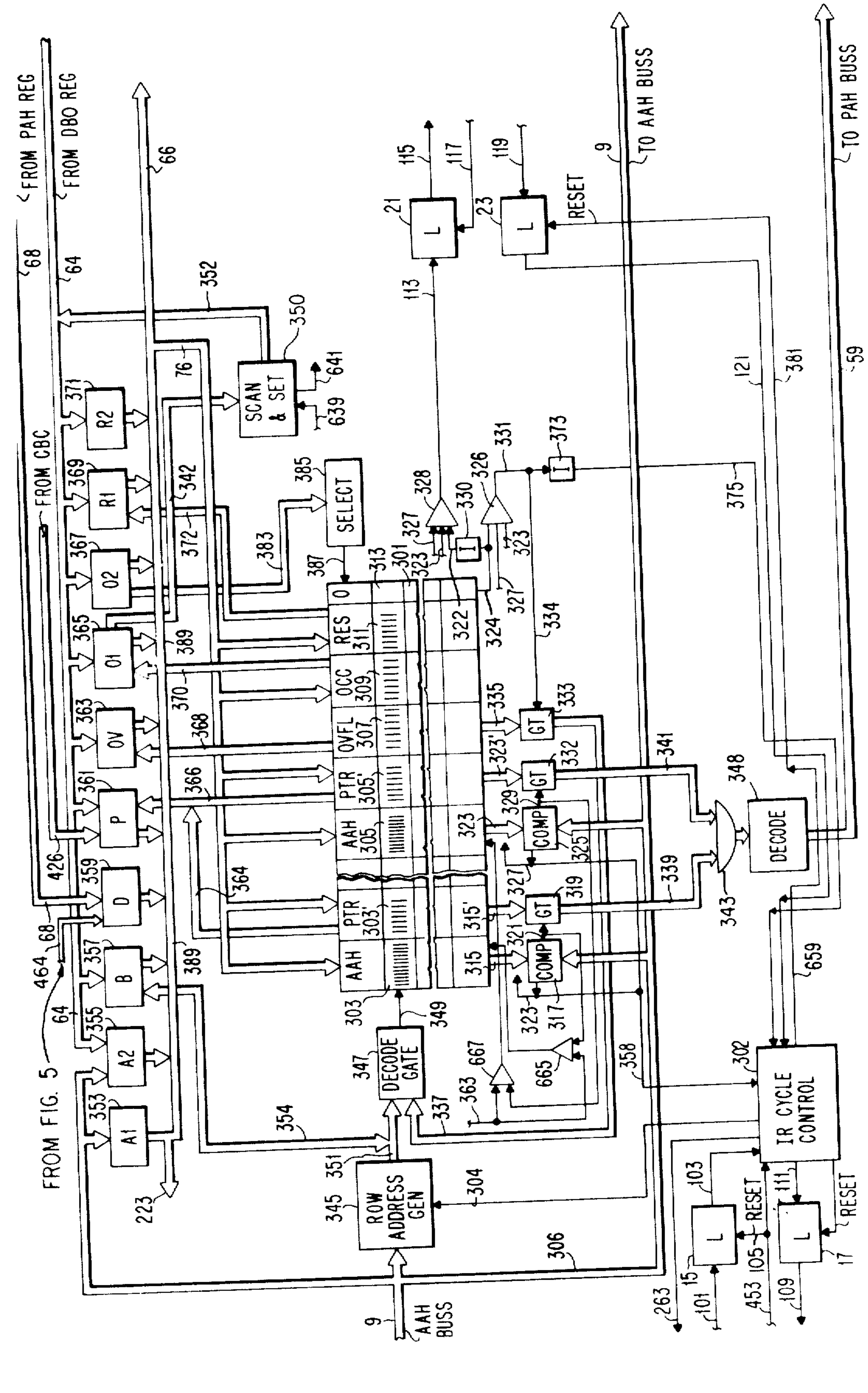
FIG. 4 is a detailed diagram of the Immediate Reference portion of the storage manager.

The IR comprises generally a hardware map 301 which is comprised of volitile storage such as core, or the like. The map may be viewed as a posting means for posting the block addresses of those blocks presently stored in high speed store. The IR also comprises control registers, address generation means, decoding means, selection means, and cycle control means all of which is interconnected by various gating and bussing means. A detailed view of the IR is seen in FIG. 4. As seen in that FIG., the IR hardware map is indicated generally at 301. This hardware map is a volitile storage map, such as core storage or the like, which is divided into fields. The IR map 301 comprises several field pairs indicated generally as 303, 303' ... 305, 305'. In each of these field pairs, the field designated AAH indicates the high portion of an AA which is resident somewhere in high speed storage 3. The associate PTR field in a given pair comprises a pointer which is a condensed address of the high speed storage core block which corresponds to the issued AAH. There are several AAH–PTR pairs in a row. Also included in each row is a single overflow register, such as OVFL 307, a single occupancy register such as OCC 309, and a single reserved register, such as RES 311. Also included is an overflow bit for each row, such as O, 313. As can be seen from the first row of the map, the general organization is such that the information obtained on a read out cycle of a row contains several AAH–PAH pairs, plus suitable control information. Further, the IR map is several rows deep and therefore accommodates the information necessary to map the location addresses (PAH's) of all the data blocks resident in the system high speed storage 3. The size of the IR map is, in fact, chosen to accommodate at least that number of data blocks. The OCC field for each row is bit positional and contains an occupancy bit for each AAH slot in the row. The RES field in each row is also bit positional and contains a bit for each AAH in the row. That is to say, a bit position on in the OCC field indicates that information is contained in the corresponding AAH–PTR fields, (or slot) in the row. Likewise, a bit on in the RES field indicates that the corresponding slot in that particular row is reserved. The purpose of slot reservation will be hereinafter explained in detail.

Further, each IR may cycle provides for automatic regeneration of the row which was read out. The need for means to regenerate a given row upon a readout cycle will be recognized by those skilled in the computer art. However, such means, being well known, are not shown in the drawing in the interest of clarity and ease of illustration.

With continued reference to FIG. 4, the AAH buss is seen generally at 9. The AAH buss 9 is an extension of the AAH buss seen in FIG. 3. AAH buss 9 has entry into the A1 register 353 and the A2 register 355. AAH buss 9 also has entry into row address generator 345 as well as to associative comparison means 317, 325. Comparison means 317 is an associative type comparator such as those seen in the IA of FIG. 3. Comparator 317 has a line 321 indicating a successful comparison. Furthermore, line 323 indicates a nonsuccessful attempt at comparison. Line 321 is a conditioning line for gate 319. Gate 319 has entrance buss 339 into OR gate 343. Line 329 of comparator 327 likewise conditions gate 332, which is similar to gate 319 and has a similar entrance buss 341 or to OR gate 343.

Row address generator 345 generates an IR map row address from the presented AAH utilizing a randomizing address generation algorithm. Address randomizing techniques are well known in the art and will not be discussed further here. For further information on randomizing techniques the reader is referred to: IBM Systems Journal—Vol. 2 Jun. 1963, Werner Buchholz, File Organization and Addressing. The output row address from generator 345 is a row address on buss 351 which, when applied to decode gate 347 is decoded and presented over line 349 to select a specific row in the IR map for readout. Each AAH–PTR pair is readout over its respective readout busses to a respective comparator-gating pair. For instance, the AAH–PTR pair in the first slot of the chosen row is readout over busses 315, 315' to comparator 317 and gate 319. Simultaneously, all slots in the given row are readout to their respective comparator-gate pair. Thus, slot 305, 305' is readout to comparator-gate pairs 325, 332. Furthermore, the overflow field OVFL of the given row is concurrently readout over buss 335 to gate 333. Gate 333 is conditioned by line 334 and connected via buss 337 to the decode gate 347. The OVFL register 307 is utilized only in the case where a given AAH–PTR pair will not fit in the given row. When this occurs the OVFL register will contain the alternate row address. The 0-bit 313 is set to indicate that there is an overflow of this row so that the OVFL register contents are used if no comparison is accomplished.

Also shown in FIG. 4 are several control registers. These registers are A1 register 353, A2 register 355, B register 357, D register 359, P register 367, OV register 363, O1 register 365, C2 register 367, R1 register 369, and R2 register 371. The A1 and A2 registers are each entered into by AA buss 9. In addition, the A2, B, P, OV, O1, O2, R1, R2 are entered into directly from buss 64 which, as seen in FIG. 2, is an entrance from the DBO register 85. Entrance is also made via buss 352 from scanning means 350. Scanning means 350 has entrance via buss 342 from register O1. Scanning means 350 has enabling line 639 connected thereto. Scanning means 350 will be explained in detail in FIG. 4A.

The above described registers all have exist to buss 66 which, as seen from FIG. 2, is connected to DBI register 79 for reading data contained in the control registers into high speed storage 3.

Buss 66 also has an extension 76 for entering data from any of the control registers into any field of the IR map. B register 357 has an entrance over two-way buss 354 for accepting address data from row generator 345 and presenting address data to decode gate 347. D register 359 has an entrance over buss 68 which comes from the PAH register 69 for receiving PAH address information. P register 361 has an entrance 364, 366 from each PTR field in the IR map. OV register 363 has an entrance via buss 368 from each OVFL field of the IR map. O1 register 365 has an entrance 370 from each OCC field of the IR map. Likewise, R1 register 369 has an entrance 372 from each reserve field of the IR map.

AND gates 326 and 328 are also provided. AND gate 326 has inputs from lines 323, 327, each representing a signal indicative of a noncomparision from comparators 317, 325. A third conditioning signal to AND gate 326 is from line 324 which is connected to the 0, overflow bit, of the select row in the IR map. AND gate 326 has an output 331 which is connected to line 334 which, as mentioned previously, is a conditioning line to gate 333. Line block 373 has output 375 connected to IR cycle control 302. AND gate 328 also has lines 323, 327 as conditioning lines, as well as line 322. Line 322 is the inverse of line 324, after passing through inverter block 330. The output of gate 328 is by way of line 113 which sets CBC latch 21. A signal over this line sets latch 21 to indicate to the CBC over line 115 that is its services are needed. Also shown in FIG. 4 is latch 23 from the CBC. A signal from the CBC over line 119 will set latch 23 which will provide a signal over line 121 to IR cycle control 302 which will indicate that control has been turned over to the IR from the CBC. Latch 23 is reset via line 381 from IR cycle control 302. IR cycle control 302 also has an input via line 103 from latch 15 which is settable from the IA. Line 111 from IR cycle control is used to set latch 11 for is signalling the IA over line 109 that its services are necessary. Line 263 also proceeds from IR cycle control to the IA and a signal over this line indicates that an interrupt is to be initiated as explained previously.

Finally, decode 348 is Decode 12is connected to OR gate 343. As explained earlier, entrance to OR gate 343 is made through busses 339, 341 which will contain a pointer which represents a condensed high speed store block address which contains a given AAH. This condence block address is presented to decode 348. The decode expands the address to a PAH to be presented to buss 59 for presentation to the PAH register 69. As previously mentioned, the addressing capability of the machine of the present example is 12-bits for a high order portion of the address. However, the capability of the high speed storage may only be, say, for example, 32 blocks. Therefore, the pointer in the PTR field need only be 5-bits wide. However, to translate the 5-bit pointer into a 12-bit wide PAH address, the high order 7-bits of which are zero, decode 348 is provided. The output of decoder 348 is, therefore, a 12-bit wide PAH for addressing core. This gives the system a certain amount of modularity. If at a later time the system high speed store is expanded, say to 64 blocks, the output of the decoder 348 is already in condition for direct accessing of the expanded high speed store.

Immediate Reference Operation will be recalled from the description of the IA, the IR is called into play when the presented AAH is one which was not recently processed against. That is to say, the IA did not have a record of the issued AAH in one of its register pairs 201, 201', ..., 202, 202'. It therefore set latch 15 via line 101 and latch 15 sent a signal to the IR over line 103 which indicates that the services of the IR were required. As will be recalled, the function of the IR subsystem is to determine determine whether or not the issued AAH designates a core block which is resident anywhere in high speed storage 3, although it is not one recently processed against, of which the IA would have a record. Therefore, an IR cycle, to be explained subsequently, will be initiated. The outcome of the cycle will reveal one of two situations. In the first situation it will be discovered that the issued AAH designates the address of a core block which is present in high speed store, somewhere, and that AAH will be translated to a PAH by the IR and sent via buss 59 to the PAH register 69 for accessing data which will be directly presented to the issuing CPU. The second eventuality is that the IR will discover that the issued AAH does not designate a core block which is resident anywhere in the high speed storage 3. In this eventuality the IR transmits a signal over line 263 to the IA to enable it to initiate an interrupt to the issuing CPU. The IR also sets latch 21 which is its communication latch to the CBC 35, the setting of said latch indicating to the CBC that its services are needed for allocating a core block into which the data, designated by the AAH, will be placed upon retrieval from the bulk storage. Detailed operation of the IR subsystem is as follows.

IR Case 1—AAH Designates Core Block Resident in High Speed Storage

With reference to FIG. 4, latch 15 has been set on by the IA over line 101. Latch 15 being set on emits a signal over line 103 to IR Cycle Control 302. It will be recalled, relative to the description of the IA, that when an IA cycle occurred, the issued AAH was stored in the A1 register in the IR.

At the time the AA was presented to the IA, it was also presented to row address generator 345 of the IR in anticipation of the noncomparison in the IA. A signal over line 103 indicates a noncomparison and causes the IR cycle control to emit a signal over line 304 to row address generator 345 to begin the IR cycle. This signal over line 304 enabled the row address generator 345 to generate its randomized address over buss 351 and present same to both the B register 357 and the decode gate 347. The AAH is also presented via buss extension 306 to each comparator 317, 325. Presentation of the randomized row address over buss 351 to decode gate 347 causes line 349 to readout each AAH-PTR register pair to its respective comparator-gate pair, and also to readout the OVFL field to gate 333. Concurrently, the OVFL field is stored in the OV register, the OCC field is stored in the 01 register and the RES field is stored in the R1 register. By the nature of randomizing techniques, if the AAH is located anywhere in the IR map, it will be located in that row whose address was generated by generator 345, a high percentage of the time. However, a small percentage of the time, it may happen that a given row has "overflowed."

When this occurs the overflow 0 bit is set to 1 and the OVFL register will contain a direct address or points to another row. The presence of a bit in the O register causes the OVFL register contents to be directly transferred to the decode gate 347 if no comparison is made and another cycle to be taken. If there has been an overflow, the row to which the address has overflowed will be set in the OVFL field of the accessed row and the overflow bit (0) will be set on in the that row. The reasons for this are as follows. It is the purpose of the IR cycle to broadside compare the AAH via buss 306 with each stored AAH in the accessed row of the IR map. This is done by reading out each AAH-PTR pair to its respective comparator-gate pair. A comparison in any of these pairs in a given row would mean that the sought after AAH is resident in high speed storage. The corresponding PTR is gated through its gate, such as 319, 332, under control of an enabling signal from equal compare lines 321 or 329. This causes the PTR from the row slot which successfully compared to be gated out of its row to OR gate 343 and then to decode 348. In decode 348 the PTR is translated into a PAH which, for the present example is 12 bits wide, and is sent to the PAH register 69 via buss 59. The data desired is then under control of the PAL in PAL register 16 and the PAH in PAH register 69 and the data is sent to or from system high speed store over busses 81 or 83, depending upon whether the command is a store or a fetch. Thus, if the IR map has determined that the issued AAH, though not recently processed against, is still somewhere in store, the pointer to that particular core block designated by the AAH will be gated out as explained above, decoded to a PAH, sent to the PAH register and the data will be stored or fetched. In the eventuality that the overflow bit is on, say in slot 313 of IR map 301, this indicates that the issued AAH may be in a second row in the IR map, the address of this second row being in the OVFL field of the first accessed row. In this case, operation will be as follows. The AAH would come in over buss 9, row address generator 345 would generate a randomized row address which would be decoded in decode gate 347 and sent over line 349 to access the indicated row in the IR map. Each AAH-PTR pair will be broadside compared in its respective gates 317, 325, but since the AAH is not in the accessed row, since it was stipulated to be in an overflow row, the noncompare lines 323, 327 would be up. These noncompare lines are connected to gate 326 along with the overflow bit from the accessed row. The overflow bit being on, and the noncompare lines being up, gate 327 sends a signal over line 331 and 334 to gate the OVFL field out of the accessed row. The signal from the overflow bit, such as 313, indicated that there are more AAH's to be checked in another row, the address of which is given in the original row's OVFL field, such as 307. Hence line 334 enables gate 333 to gate the OVFL field to the decode gate 347 via buss 337 to access the new row. If the AAH is found via a new comparison in comparator 317, 325, the corresponding pointer in the new row is gated out via gate 319 or 322 and is decoded in decode 348 and sent to the PAH buss and accessing is achieved as before.

IR Case 2—AAH Designates Block Which is not Resident in Core

In the eventuality that the presented AAH is not resident in core, the IR map will determine this fact as follows. The AAH will be presented over buss 9 to row address generator 345 and also concurrently to register A1 and comparators 317, 325. The row address will be generated to access the IR map over line 349 from decode gate 347. The control registers are loaded with the same field as for IR Case 1, above. All comparisons will result in a no compare, including comparisons from any overflow row. At this point lines 323 and 327 from the no compare side of the comparators 317, 325 send a signal over line 358 to the IR cycle control to cause IR cycle control to send a signal over reset line 105 to latch 15 to block entrance to the IR from the IA. This is done for each IA on a line.

Lack of successful comparison from any of the AAH's in the rows designated indicates that the CBC must be called into play. The entrance to the IR is now temporarily blocked (although each CPU can continue with successful IA references). Control is given to the CBC in the following manner. No compare lines 323, 327 condition AND gate 328, along with the signal on line 322 indicating that the 0; occupancy, bit for the given row or rows is not on. This causes an output signal over line 113 to set latch 21 to present a signal over line 115 to the CBC indicating that it is to be given control. The signal over line 358 which blocked entrance to the IR also causes a signal to be sent over line 263 to the IA. Line 263 is also seen in FIG. 3, and conditions AND gate 254 to set latch 256 to give an interrupt signal to the CPU over line 110. The interrupt signal will be interpreted by the CPU as an indication to go to another program while the desired data designated by the AAH is being brought into high speed store from bulk store. Also, the reason for blocking entrance to the IR is that when the CBC designates a core block in high speed storage to receive the desired data from bulk storage, the IR map must be updated to indicate that the desired AAH is now in a given core block. Hence it is necessary to prevent IR references during this time so that the IR will be available for updating. Control is now turned over to the Core Block Control, to be subsequently explained.

Core Block Controller Subsystem Structure

Figures 5, 5A:
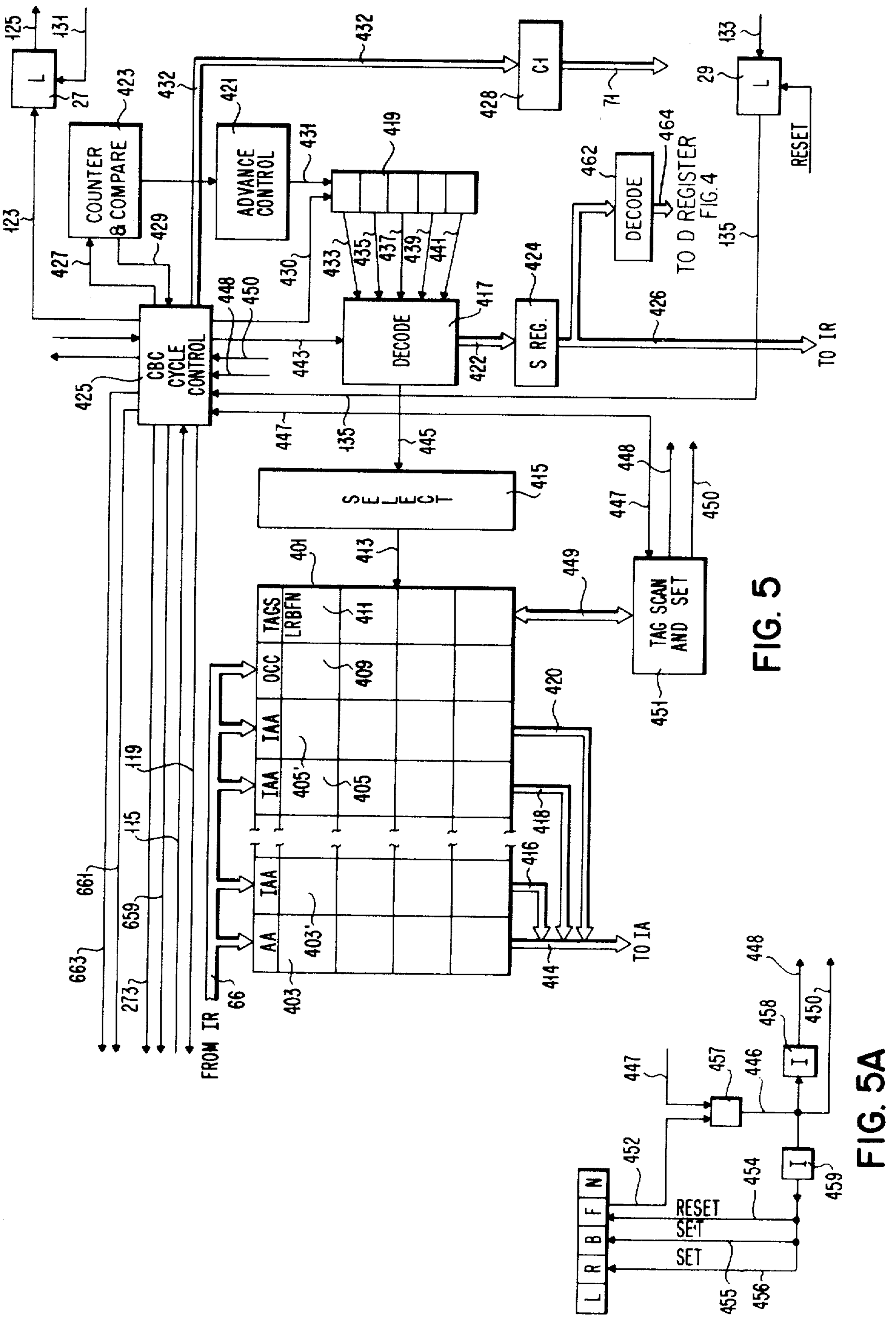
FIG. 5 is a detailed representation of the Core Block Controller portion of the storage manager.
FIG. 5A is a representation of a portion of the Tag Scan and Set hardware seen generally in FIG. 5.

The Core Block Controller (CBC) is seen generally in FIG. 5. The CBC comprises another hardware reference map indicated generally at 401. This map is similar to the IR map in that it is comprised of volitile stores such as core storage or the like, and also includes regeneration means. As with the IR map, regeneration means are well known and are not shown in the drawing, for purposes of clarity. There is a single row of volitile storage for each core block in the IR map. For instance, if there are 32 core blocks, (each containing $2^{12}$ bytes of data, for example) then there will be 32 rows in the CBC map 401. Each row of the map is divided into fields. The AA field in each row indicates what AAH is located in the given core block.

Each row also has a tag field, the tags indicated as being L,R,B,F,N. It is the function of the CBC to determine from the information in the CB map which, if any, core blocks are available for receiving a page of data from bulk storage. If no block is available, that is, if they are all busy, the CBC must determine from the information in the CB map, which core block to turn out to bulk store so as to to make that core block available to receive the page of desired data from bulk store. This is done with the aid of the tags. The tags are as follows: R stands for Reserved, B stands for Busy, F stands for Free, N stands for Next. As will be explained in detail subsequently in this section, the CBC scans the tags in each row looking for an F bit. If an F bit is found it means that the corresponding core block is free and the page of data will subsequently be turned in from bulk storage to that given core block. When a free bit is found, it is turned off and the B, Busy and R, Reserve bits are turned on in that tag field which indicates that the page of data specified by the AAH will be turned in from bulk store to that particular core block. This is termed allocation and will be described in detail subsequently. If, when scanning the tags the CBC finds no F bit on, it then looks for an N bit which indicates the next core block to be turned out. In general, as will be explained, there will only be a single N bit on in the entire CB map at any one time. This N bit indicates that that particular core block is the next core block to be turned out. The N bit will then be turned off and the R and B bits will be turned on. This situation indicates that this particular core block which had its N bit on will now have its data turned out to the bulk stores. This is termed reallocation of core block data into the bulk storage. Once the data is turned out, or reallocated, that core block is now available to receive the data, designated by the issued AAH from bulk storage. This again, is the allocation phase.

Continuing with the structural description of CBC, each AA field in the CB map has an entrance via buss 66. It will be recalled that buss 66, originating in the IR, is a buss from the control registers. Its use is to gate information from either of registers A1 or A2 into the various AA or IAA slots of the CB map. Also, each AA slot has an exit buss 414, 416, 418, 420, which enters to the AAH buss 9 in the IA, as seen in FIG. 3. Also seen in FIG. 5 is line 115 and line 119. It will be recalled that line 115 proceeded from latch 21 at FIG. 4 from the IR Map. A signal over line 115 goes to CBC cycle control to indicate that CBC action is necessary. As will be recalled, line 119 goes to latch 23 of the IR as seen in FIG. 4. A signal over line 119 from CBC cycle control turns control back to the IR. Line 123 proceeds from CBC cycle control to latch 27. A signal over line 123 sets latch 27 to send a signal over line 125 to the PTC, to be explained subsequently in detail, indicating that the services of the PTC are required. Line 131 is a reset line for latch 27 and proceeds from the PTC. CBC contains a ring counter indicated generally at 419. The ring counter may be any type of ring counter known in the prior art, such as any of those described in the text Arithmetic Operations In Digital Computers, cited previously. The length of the ring counter is dependent upon the number of core blocks in the system. Output lines 433, . . ., 441 proceed from ring counter 419 into decode 417. The output of decode 417 is by way of buss 445 to select means 415 for selection of a given row from the CB map over line such as 413. CBC cycle control is connected to the ring counter via line 427, counter 423, advance control 421 and line 431. Counter control 423 is also connected to CBC cycle control by means of line 429. Line 430 is connected from CBC cycle control 425 to ring 419 for ring reset purposes.

The tag field of each row is connected to buss 449 which is a two-way buss connecting the tag field of a given row selected by a line such as 413 from select means 415, with TAG SCAN AND SET 451. TAG SCAN AND SET 451, described in detail in FIG. 5A, is used for scanning each tag field to check for a free bit F, or a next bit, N, and set the proper tags on and off, as will be explained. CBC cycle control 425 is connected via line 447 to TAG SCAN AND SET 451, and lines 448 and 450 connect TAG SCAN AND SET 451 for sending control information to the CBC cycle control. The purpose of ring 419 is to provide a row address to designate which tag field is to be scanned at a given time. This is done sequentially by stepping the counter. For instance, in a 32 core block system, the counter will have 32 positions, each time the counter is advanced, a tag field of a given row will be read out, scanned for an F-bit on, and if it is on appropriate action to be explained subsequently will be taken. If the F-bit in the field presently being scanned is not on, a signal over line 450 to CBC cycle control will indicate that the ring should be advanced to scan the next tag field. However, it may be that all F-bits are off, indicating that all core blocks in the system are busy. In that event, the ring 419 would cycle continuously. In order to prevent this situation, counter control 423 is provided. After each scan a signal on 427 advances counter control 423 which makes a comparison against the current ring position and the number representing the total number of core blocks in this system. If the total number of rows has not yet been scanned, counter 423 will signal advance control 421 to advance the ring 419 to its next position via line 431. If, however, counter 423 detects that the ring has been advanced to all row positions once, and no F-bit bit has been found on, it will send a signal over line 429 to CBC cycle control which will then reset the ring for the next phase of scan, to be described subsequently. This insures that the ring 419 does not cycle forever when no F-bit is on in the entire set of tags.

Decode 417 is connected via buss 422 to S register 424. The output of decode register over buss 422 is the decoded output, which proceeds over buss 426 to P register 361 in the IR. This decoded output is in the form of a pointer, and will ultimately be used as an input to the PTR field of a given row in the IR. The S register also enters to decode 462 which is the same type as decode 348 of FIG. 4. The output of decode 462 is the PAH of the allocated core block, and proceeds over buss 464 to the D register.

CBC cycle control 425 is also connected to register C1 via buss 432. Register C1 is an 8-bit, bit position significant, register which will be used to hold control information. This register is settable over buss 432 which comprises a series of eight wires from CBC cycle control 425 for setting various bits in the C1 register. The setting and meaning of each bit in the C1 register will be described subsequently and the contents of the C1 register will hereinafter be referred to as the control field. Finally, line 135 proceeds from latch 29 to CBC cycle control Latch 29 is set from line 133 of the PTC and a signal over line 135 to CBC cycle control 425 indicates that the PTC is turning control back to the CBC. This will be explained in the PTC section of this application.

Turning now to FIG. 5A, there is seen a portion of TAG SCAN AND SET 451 of FIG. 5. Scanning and setting means are well known to those skilled in the art. However, in the interest of clarity, a possible way of scanning and setting the tags of a given row will be shown in FIG. 5A. As in FIG. 5A, a given tag from a given row has been read out via buss 449 under control of line 413, for example. In order to check whether the F-bit is on in a given tag field, that F-bit is connected via line 452 to EXCLUSIVE OR gate 457. Also, a 1 signal is connected over line 447 from CBC cycle control 425 to the second entry to the EXCLUSIVE OR gate 457. If the F-bit is on, that bit and the 1-bit over 447 will cause a 0 bit on line 446. The 0 bit will pass through invert block 458 to line 448 and thus send to CBC cycle control which indicates that the F-bit is on and that a core block is about to be allocated. Concurrently, the 0 bit on line 446 is passed through inverter 459 to reset the F-bit over line 454 and to set the R- and B-bit over lines 456 and 455. In the event that the F-bit had not been on, the output of line 446 would have been a 1 which would have been transmitted over line 450 to CBC cycle control. This would indicate to the CBC cycle control that a free bit has not been found and that the position of ring 419 so should be advanced by 1, counter comparison 423 permitting. Proper timing lines have, of course, beem assumed as are well known to those skilled in the art. Scanning for the N-bit can be completed in a manner similar to that shown in FIG. 5A for the F-bit.

Core Block Controller Operation

As will be recalled from the description of the IR, the CBC is called into play when the presented AAH is one which designates a core block which is not resident anywhere in high speed storage. At that point, a signal was sent over line 113 to set latch 121, of FIG. 4, in order to send a signal over line 115 to the CBC to indicate that its services are needed to allocate a core block for receiving the desired data from bulk storage; or for reallocating data within a busy core block to bulk store in order that a core block may become available for page allocation from bulk store. CBC operation may result in either of two cases. First, after being called into play, the CBC hardware scans the CB map tags in the CBC and may discover a free, or F, bit on. This indicates that the core block corresponding to the row in which the F-bit was found on is free of data and can be allocated for receiving the page of data designated by the originally issued AAH. In this case the F bit of that tag field will be turned off and the R- and B-bits will be turned on. The PTC will then be signaled to set up control information which the SCU will use for transmitting the desired page of data into the allocated core block corresponding to the row in the CB map in which the F-bit was found on. The second case is that in which the hardware in the CBC scans the tags in the CB map 401 and finds no F-bit bit on. This indicates that no core block is available for allocation. In this case, the CBC hardware must again scan the tags to find that tag which has its N-bit on, indicating it is the next block to be turned out, or reallocated. The CBC will turn off the N-bit and turn on the R- and B-bit, and will then signal the PTC that it is to set up control information to enable the SCU to turnout the data in the core block corresponding to the row in the CB map 401 in which the N-bit was found on; and subsequently setting up control information for enabling the SCU to turn-in the page of data designated by the issued AAH from bulk store into this vacated core block. The CBC portion of this sequence of operation will now be explained.

CBC Case 1—Determines that High Speed Storage Contains a Free Core Block Allocation Line 115 receives a signal from latch 21 of the IR–CBC interface. This signal is sent to CBC cycle control enable it to reset ring 419 over line 430 to advance the ring to its first position. The output of the ring over lines 433, . . . 441 is decoded into a row address, sent to select means 415 via buss 445, and the first row of the CB map 401 is selected via a line such as line 413. Concurrently, the output of decode 417 is sent via buss 422 to S register 424. The tag field of the selected row is read out to tag scan and set 451 via buss 449. As explained above, relative to FIG. 5A, if the F-bit is not on, a signal proceeds over line 450 to CBC cycle control. This signal causes CBC cycle control to advance counter 423 over line 427. Counter and compare 34 423 then compares the ring position with the maximum ring position, if the ring position is presently at its maximum, it means that all rows have been scanned and no F-bit is found on. This will result in reallocation, to be discussed next below in CBC Case 2. Assuming that the position of the counter is not equal to its maximum position, this means that the tags of all rows have not been scanned and counter and compare 423 will signal advance control 421 to advance counter 419 over line 431 to its next position. The output of counter 419 will again be decoded in decode 417 and the next row will be selected. The tags will again be scanned. Assuming, for CBC Case 1, that an F-bit is found on, this means that the core block corresponding to the row which has been selected is available to receive the page of data designated by the originally issued AAH. This is indicated by a signal on line 448, of both FIG. 5A and FIG. 5, to CBC cycle control. It will be recalled that during this period, the entrance to the IR is blocked. Upon finding a free, or F, bit on, the signal over line 448 is a signal to the CBC cycle control to set the contents of the S register, which is the core block address in pointer form, into the P register of the IR, by way of buss 426. The PAH of the allocated core block is sent via buss 464 to the D register. As mentioned, relative to FIG. 5A, the given F-bit is set off and the R- and B-bits of the tags are set on. The reason for setting the pointer from the S register to the P register is that the pointer will ultimately be placed into a PTR field and the issued AAH in the A1 register will ultimately be set into the corresponding AAH field, both in the IR map, when allocation of the desired page of data is complete. The PAH in the D register will allow addressing to the allocated core block and its associated segment as discussed subsequently relative to the SCU. Thus far, the row in the CB map 401 which had the F-bit originally turned on, now indicates the core block into which the page of data from bulk storage will be placed. The F-bit bit has been turned off and the B- and R-bits bits have been turned on such that during subsequent scans the core block will be recognized as busy and reserved for data. Further, the pointer corresponding to the row of the CB map, which corresponds to the allocated core block in high speed store, has been set into the P register in the IR. At this point, the contents of the A1 register 353 are set into the CBC–AA slot at the currently selected row. This is done by way of buss 66 from the IR into the CBC, into the proper slots under control of gating means well known to those skilled in the art. As will be recalled from the description of the IR, the A1 register 353 contains, at this time, the originally presented AAH. As will be further recalled, the OV, 01, and R1 registers in the IR contain the contents of the OVFL, OCC and RES fields of the row designated by the address from row address generator 345, and stored in the B register in anticipation of a CB cycle. This information will now be utilized for control purposes when the CBC updates the IR map to indicate in which block in high speed store the page of data designated by the issued AAH has been placed. In doing this, the CBC will cause the contents of the 01 register in the IR to be scanned to locate an off bit. Since the 01 register at this time contains the contents of the OCC field of the chosen row in the IR map, the presence of an off bit in the 01 register will indicate that a given AAH–PTR pair in the selected row in the IR map is vacant and can be used for updating purposes. When an 01 bit is found to be off, that bit and its corresponding bit in the 02 register is turned on. Also, the corresponding bit in the R1 and R2 registers is turned on. This is done in SCAN AND SET means 350, in block form in FIG. 4. The means for doing this are well known to those skilled in the art. However, for sake of clarity a typical portion of the SCAN AND SET means 352 is seen in FIG. 4A.

Register 01 is connected via line 603, 605, 607, 609 to EX–OR gates 621, 623, 625, 627. The other inputs to the EX–OR gates are respectively, lines 611, 613, 617, 619. These lines are part of a buss 342 seen in FIG. 4. This buss ultimately proceeds from CBC cycle control 425 of FIG. 5. The output of each of the respective EX–OR gates is connected to OR gate 638, having an output line 639. The outputs of the above gates comprise lines 629, 631, 633, 635 and are connected via buss 352 to buss 64. Each of the last mentioned lines are connected from buss 64 to AND gates 643, 645, 648 647, 649. The respective second inputs to each of the above AND gates are via line 641 which proceeds from CBC cycle control 425 of FIG. 5. The output of each of the last named AND gates are via lines 651, 653, 655, 657 for setting individual bit positions of register 02. Line 639 is further connected as an input signal to CBC cycle control 425 in FIG. 5. Operation proceeds as follows. When the time arrives for scanning the 01 register, CBC cycle control issues signals sequentially over line 611, 613, 617, 619 to individually test the bit positions of the 01 register and to set on in the 01, 02, R1, R2 registers that bit position corresponding to the bit position found off in the 01 register. The bits might be generated in the CBC cycle control by any well-known means, such as a ring counter. As the first test bit comes over line 611, it is exclusive-OR'ed with the first bit position of the 01 register over line 603. If that bit is off, a 1-bit will appear at the output of the exclusive OR gate 621. Concurrently, this 1-bit will be sent over both line 629 via buss 352 and over line 639 via OR gate 638. Line 639 will transmit a signal to CBC cycle control 425, which upon receipt of said signal will cause a set signal to be issued via line 641. The set signal over line 641 will cause a signal proceeding over line 629 of buss 352 to set the corresponding bit in the 02 register via gate 643 and line 651. If, however, line 603 did not detect that the corresponding bit in the 01 register was off, the output of exclusive OR gate 621 will be a zero bit which will be transmitted over line 639 to CBC cycle control 425, which would indicate to the CBC cycle control to transmit the next subsequent bit over line 613 of buss 340 to check the next position in register 01. Although the lines in buss 352 are shown only as setting bits in register 02, it will be apparent to those skilled in the art that similar logic can be constructed for setting the corresponding bits in register 01, R1, and R2. Setting the bits as explained have provided control information in the registers named as follows: 01 and 02 registers will now contain a bit on in the position corresponding to the AAH–PTR pair slot of the selected row of the IR map which will ultimately contain updated information relative to the core block in which the data indicated by the AAH will be located. The bit turned on in the R1 and R2 register will indicate tat the aforementioned AAH–PTR slot is reserved. There are two occupancy registers OC1 and OC2 and reserve registers R1 and R2 since one set is used with the row and the other set with the slot. At point an IR cycle is taken using the contents of the B register 357. It will be recalled that the original IR cycle stored the address generated by generator 345 in the B register via buss 354. Now, during the allocation phase of CBC operation, this same row address will be sent back via buss 345 to Decode Gate 347. Likewise, the on bit in the 02 register will be read out via buss 383 to select means 385 to select the pointer field in the chosen row. Thus line 349 from decode gate 347 and line 387 from select means 385 act as a two dimensional selection means for selecting the AAH–PTR slot, indicated by the 02 register, in the accessed row. Assume the slot is 305, 305′. The contents of the P register will then be set into PTR field 305′ over buss 76. Likewise, under control of appropriate gating from the CBC cycle control, the 01 register is loaded into the OCC field 307, the RES field 311 is loaded with the contents of the R1 register and the AAH field 305, corresponding to the chosen PTR slot, is loaded from the A1 register. It will be recalled that the A1 register contains the originally issued AAH. This is now loaded into the AAH field of the AAH–PTR slot selected. This sequence effectively updates the IR row to indicate that the desired page of data indicated by the originally issued AAH will be turned in at the core block indicated by the pointer which is now set into the PTR field of the selected IR slot. The next time the CPU issues the AAH, an IR reference will occur and the AAH which has just been sent into the AAH field 305 will successfully compare and this corresponding pointer from the PTR field 305′ will be read out and decoded to a PAH as described previously in the IR operation section. At this point, the contents of all control registers will be stored in a predetermined location of the convention core block. The reason for storing this information is so that it can be used later for control purposes when the page of data is turned in from the bulk store via the SCU to the designated core block in the P register.

As a final step in the allocation cycle, the CBC must set up control information in the C1 register 428, to indicate the steps to be taken by the PTC 31. The C1 register is an eight bit register which is position significant. The meaning of each position is as noted below:

B0—A page has to be turned in
B1—A page has to be turned out
B2—Unused
B3—This segment is being serviced by SCU
B4—The SCU has completed service on this segment
B5—The CBC has finished service
B6—The PTC has finished turnout service
B7—The PTC has finished turn-in service The CBC has just finished an allocation sequence, which means that it has allocated a core block to receive a page of data which was specified by the originally issued AAH, but which is presently in the bulk storage. Hence, the CBC cycle control will set bit B0 on in the C1 register 428 over buss 432. The contents of the control register C1 will hereinafter be referred to as the Control Field. The Control Field is to be stored in the first byte position of the control segment for the affected core block, mentioned previously, in Convention Core. It will be assumed for purposes of this illustration that the convention core block is the first block of the high speed storage storage, with an address of 000000000000. The contents of the control registers in the IR will be stored in the control segment after the control field.

In summary, an unsuccessful IR cycle as indicated to the CBC that the issued AAH designates data which is not in system high speed storage, and must be turned in from the bulk storage. The CBC has scanned the tag field of each row in the CB map, determined that a core block was free, and has allocated this core block to receive information from the bulk store via the SCU under control of information which will be set up by the PTC, to be discussed subsequently. At this point the CBC takes a high speed storage cycle and stores the C1 register, and the control registers of the IR in a control segment associated with the allocated core block, in convention core. The CBC cycle control then emits a signal over line 23 to set latch 27 to signal the PTC over line 125 that its services are needed. The CBC cycle control will then send a signal over line 659 to IR cycle control 302 of FIG. 4 to reset latch 15, thereby making the IR available for subsequent cycles.

It is the purpose of the reserve bit in R1 to indicate that a block is in transit from bulk store storage. When a page has been turned the R1-bit is reset to zero.

CBC Case 2—CBC Determines that the High Speed Storage Does Not Contain a Free Core Block—Reallocation Line 115 receives a signal from latch 21 of the IR–CBC interface. Operation proceeds as for CBC Case 1, above except that no F-bit is found to be on. In this situation, Counter and Compare 423 will signal the CBC cycle control 425 that the tags of each row of CBC map 401 has been scanned once. CBC cycle control will reset ring 419 via line 430 and a signal over line 427 to counter compare 423 will initiate a second scan of the tags of each row of the CB map 401. Lack of an F-bit on means that there is no available or free block in core to receive a page of data from the bulk storage. The purpose of scanning the tags for an N-bit on is to determine which of the core blocks is next to be turned out, to make room for a required page turn-in. It will be noted, with reference to FIG. 5, that scanning of the tags in each row is done by a sequential ring counter. There will only be a single N-bit on at any given time. Once the N-bit is detected, via sequential scanning, it is turned off and the next sequential row will have its N-bit bit turned on. Thus, it is seen that no core block will be turned out a second time until all other core blocks in the system have been turned out once. It will be recognized that other schemes for turning out core blocks, other than on the sequential basis, can be devised without departing from the spirit of the invention.

The CBC sequentially scans the tag in each row in the CB map for an N-bit on. This can be done utilizing logic similar to that seen in 5A, with the exception that the N-bit is being checked, rather than the F-bit as shown in that FIG. Upon finding an N-bit on, that N-bit will be turned off, the corresponding R- and B-bits are turned on and the N-bit of the tags of the subsequent row in the CB map will be turned on which does not have its R- or B-bits on. At this point, the CBC will send a signal over line 661 to latch 22 of the Immediate Access of FIG. 3. This will be done for all IA's on line to block entrance to the IA from the CPU. Likewise, the CBC will send a signal over line 659 to the IR cycle control at FIG. 4 in order to cause a signal over line 105 to keep latch 15 in a reset condition during subsequent operation of the CBC. This effectively blocks entrance to the IR. The storage manager will subsequently turn out the core block corresponding to the row to which the position of ring 419 has been decoded. It will therefore be necessary to purge from the IA and IR and AAH which is going to be turned out, such that any subsequent IA or IR cycle will not yield a successful comparison after the data from the indicated core block has been turned out. For this purpose the AA in the selected row of CB map 401 is read out via buss 414 and placed on AAH buss 9 as seen in FIG. 3. An Immediate Access Cycle is taken and the AAH from the AA slot of the CB map is compared with he AAH's in registers 201, 202 in the IA. If there is a successful Immediate Access it indicates that the core block about to be turned out has recently been processed against this and the record of this must be removed from the IA since the data in this core block is about to be turned out. Hence, a comparison in the IA of FIG. 3 will emit a signal over either line 230 or 232. Concurrently, a signal from CBC cycle control 25, over line 273, will enter the IA to create an equal comparison signal from line 230 or 232 via gates 265 or 267 to cause a reset of the register pair which had a record of the AAH, thus essentially erasing the IA record of the AAH which is now to be turned out. This purges the IA.

The IR must now be purged of the AAH about to be turned out. This is done by reading the AA out of its slot in the selected row in the CB map 401 of FIG. 5, via buss 414, onto AAH buss 9 and to row address generator 345. An IR cycle is then taken and the AAH is broadside compared against each AAH in the row to which it decodes, as in the normal IR cycle. Since this AAH from the CB map 401 designates a block of data which is presently in core and about to be turned out, it must compare successfully with one of the AAH's in the IR map. Concurrently with the broadside comparison in the IR, a signal will be emitted from the CBC cycle control over line 663 which will be presented to gate 665, 667 of the IR, FIG. 4. The output of each of these gates is connected via well-known selected means for resetting the AAH field in the row selected by decode gate 347. The other entrance to gate 665, 667 is provided by the successful comparison line of comparator 317, 325. As mentioned above, there must be a successful comparison since it is known prior that the AAH being compared is presently in high speed storage but will be turned out. Therefore, the signal out of the successful comparison of comparator 317, 325 will enable one of the two gates, 665, 667, to reset the AAH field which compares successfully. This essentially purges the AAH about to be turned out from the IR.

The AAH from the AA slot of the selected row of the CB map is also read into the A2 register 355 via buss 414, seen in both FIG. 5 and FIG. 2, and the AAH buss 9. It will be recalled that the A1 register contains the originally issued AAH, which now must be found in the bulk storage and turned into the slot determined by the CBC. The A2 register now contains the AAH corresponding to the block of data in the core block about to be turned out.

At this point the CBC has reallocated the core block indicated by the bit position of ring 419 to be turned out to make room for the data to be turned in. In FIG. 5, the CBC cycle control sets bits B0 and B1 on in C1 register 428 via buss 432. The contents of the C1 register are stored in the control field of the control segment of the affected core block and the controlled registers are also stored in the segment. A signal over line 123 sets latch 27 to signal the PTC over line 125 that its services are needed to set up control information for page turnout and subsequent page turn-in.

CBC Reverse Operation

After the desired page of data as been turned in from bulk storage to the allocated core block, or, after the reallocated core block has been turned out and the desired core block turned in, as the case may be, the PTC will set up the required control information in the control registers of the IR. This is done for the purpose of allowing the CBC to update the CB map and the IR map. It will be recalled, that when allocation or reallocation occurred the control registers were stored in the control segment of the convention core which corresponded to the affected core block. When the data transferred to or from bulk storage is complete, this control information is then brought back to the control registers A1, A2, B, D, P, OV, 01, 02, R1 and R2 by the CBC. The control information contained in each of these registers will again be summarized at this point.

A1—the AAH which was turned in from bulk store to a core block

A2—the AAH which was turned out from a core block to bulk store in case reallocation occurred B—the randomized address originally from generator 345 corresponding to that address by which the AAH addresses the IR map D—allocated core block address in PAH form P—the address, in PTR form of the core block affected by either page turn-in or page turnout OV—the contents of the OVFL field in the affected IR row O1—the contents of the OCC field of the affected IR map row O2—a single bit which indicates the affected slot of the row to be updated in the IR map R1—the contents of the RES field of the affected row of the IR map R2—a single bit indicative of the slot in the IR map reserved for updating Upon completion of page turn-in, and after setting up the control information in the control registers, the PTC signals the CBC by setting latch 29 via line 133. A signal over line 135 to the CBC cycle control 425 of FIG. 5, indicates that reverse operation is to take place. This indicates updating of the CB map and IR map is to take place. The CBC cycle control sends a signal over line 659 to IR cycle control 302 of FIG. 4. This causes a continual signal to be sent over line 105 to keep latch 15 in reset condition so as to block the entrance to the IR during updating of the maps. The contents of the A1 register is presented to row address generator 345 of the CBC cycle control 425. Address generator 345 generates an address and presents it over buss 351 to decode gate 347 to access the affected row of the IR map. The contents of the 02 register is read out to select means 385 over buss 383 and defines the affected slot over line 383 thus line 349 and 383 act as a two dimensional selection for accessing the AAH PTR pair to be updated, for example 305, 305'. At this point the contents of the A1 register is fed into the AAH slot 305 via buss 76 and the contents of the P register is fed into the PTR field 305', also over buss 76.

Page Turn controller—Subsystem Structure

Figure 6:
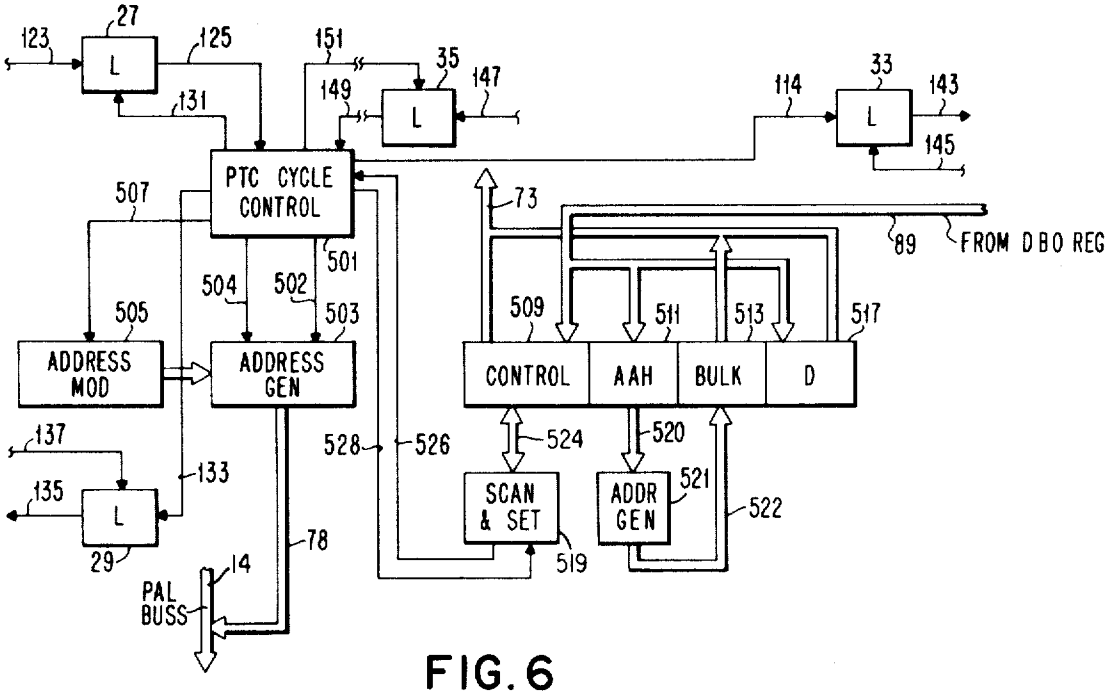
FIG. 6 is a representation of the Page Turn Controller portion of the storage manager.
Figure 6A:
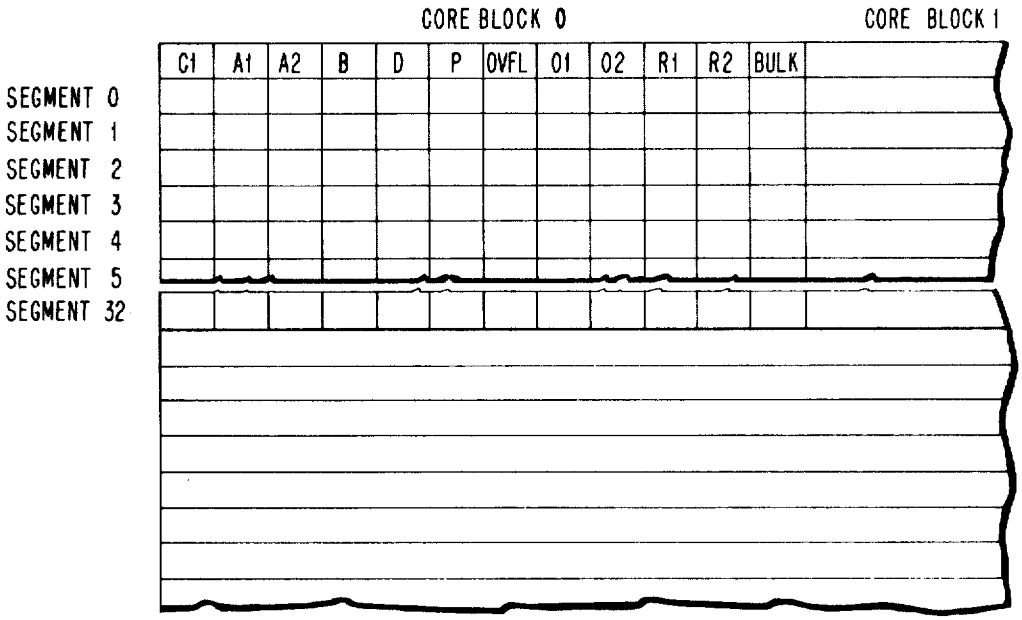
FIG. 6A is a representation of the convention core, or control storage core, of the system.

The Page Turn Controller (PTC) 31, of FIG. 2, is seen in detailed form in FIG. 6. The purpose of the PTC is to set up, from the control information stored in a given segment, the control information necessary for the SCU to turn a core block out from high speed storage to bulk storage and turn a page in from bulk storage to high speed storage. As seen in FIG. 6, the PTC comprises latch 27 which is connected to the CBC via signal line 123. Latch 27 is connected to PTC cycle control 501 via line 125. Line 131 connects PTC cycle control latch 27 for reset purposes. The PTC comprises an address generator 503 which may be a very simple address generator for generating segment addresses in convention core. As convention core has been assumed for the present example as core block 0, address generator 503 will address to the byte of information within core block 0. Address generator 503 is activated over line 502 from PTC cycle control and is resettable over line 504. Also, address modifier 505 is connected to address generator for modifying the address by adding a constant to it. Address modifier 505 is controlled via line 507 by the PTC cycle control. Address generator 503 is connected to PAL buss 14 via buss 78. Also provided in the PTC are working registers 509, 511, 513, 517. Buss 89 proceeds from DBO register 85, seen in FIG. 2, and enters into registers 509, 511 and 517. Likewise, each of the registers 509, 511, 513, and 517 has an exit buss, 73, which proceeds to DBI register 79, seen in FIG. 2. Register 511 is connected to address generator 521 via buss 520. Address generator 521 is connected to the register 513 via buss 522. Also provided is scanning means 519 connected to register 509 via two way buss 524. Scanning means 519 is used for scanning the register 509 to determine which bits are on and to set on certain bits in response thereto. Scanning means 519 is controlled by lines 526 and 528, to and from PTC cycle control 501. The structure of scanning means 519 is not shown since it is fundamental logic well-known to those skilled in the art. However, its structure is similar to that seen in FIGS. 4A and 5A for scanning bit positions in a register and setting bit positions of the same register in response to the results of the scan.

The registers 509, . . ., 517 are used to contain certain fields of the control segment from which the PTC will set up the desired control information. In ordinary operation, register 509 will contain the control field for the control segment, register 501 will contain the AAH from either the A1 or A2 field of the control segment, depending upon whether turn-in or turnout, respectively, is to be performed. Register 517 will contain the pointer in the D field in the given control segment. It is to be noted at this point that each AAH issued has a direct translation to an address in bulk storage. Hence, for page turn-in or page turnout of data designated by a given AAH, that AAH must be decoded to a bulk address. Any well-known address decoding scheme may be used and as indicated generally by the address generator 521. Thus when an AAH is read from the control segment into register 511, it is translated by address generator 521 into a bulk address and stored in register 513.

Finally, the PTC contains various communication lines with CBC and SCU. Line 133 connects PTC cycle control 501 with latch 29, which in turn is connected to line 135 which proceeds to the CBC cycle control of FIG. 5. Line 137 is for resetting latch 29 and proceeds also from the CBC cycle control of FIG. 5. Line 114 proceeds from PTC cycle control 509 to latch 33 which is connected to line 143 for signalling the SCU that its services are needed. Latch 33 is resettable over line 145. Line 147, from the SCU is connected to latch 35 which, in turn is connected to line 149. Line 149 proceeds to PTC cycle control 501. Latch 35 is resettable from PTC cycle control 501 via line 151.

Page Turn Controller Subsystem Operation

The PTC operates in two directions, both forward and reverse. Forward operation refers to that mode in which the PTC is signalled by the CBC that its services are required for setting of control information for either page turn-in or page turnout. Reverse operation refers to that mode wherein the PTC is signalled via latch 35 that the SCU has completed its task. Forward operation will be discussed first.

PTC Forward Operation—Page Turnout

A signal over line 123 from the CBC sets latch 27 which emits a signal over line 125 to PTC cycle control 501. PTC cycle control 501 then resets address generator 503 to initial position over line 501. The signal over line 502 then sends the first address to PAL buss 14. This address is that of the first control segment in convention core. A high speed storage cycle is taken and a control field of the control segment is read into register 509 via buss 89. The register is then scanned for the presence of bit B1 or B0. Assuming neither bit is found on, a signal is sent from scanner 519 over line 526 to PTC cycle control 501. This causes a signal to be emitted over line 507 to address modifier 505. Address modifier 505 adds a constant to the current address of address generator 503 which is then gated to the PAL buss 14 via buss 78. A high speed storage cycle is taken and the control field of the second control segment is read into register 509 via buss 89. Scanner 519 again scans for the presence of bit B1 or B0. This sequence continues until one of the aforementioned bit positions is found on. Assuming bit B1 is found on, this indicates that page turnout is required. The AAH present in the core block to be turned out is at this point in the A2 field of the control segment, since it was stored there by the CBC when the core block was reallocated. Once B1 is found on in the control field, the PTC cycle control causes the address generator 503 to generate the address of the A1 field in the segment which had its control field B1 on. This A1 field is read into register 511. The information read into register 511 is sent via buss 520 to address generator 521. Address generator is in essence a decoder which decodes the contents of 511, of the AAH to be turned out, into a bulk address to which the core block is to be turned out. If disc or drum storage is being used, bulk address would include both disc or drum access arm number, as well as record number. After the bulk address is generated, the control field and the bulk address are read via buss 73 back into their respective fields in the segment, as seen in FIG. 6a. PTC cycle control 501 then emits a signal over line 114 to set latch 33. This signals the SCU over line 143 that its services are needed for page turnout.

Page Turn-In

When scanning the control field of a given control segment, the PTC looks for bit B1 on first, indicative of page turnout requirement. If b1 is not on, scanner 519 will scan the control field in register 509 for a bit B0 on. If B0 is also off, a signal over line 526 will cause the signal over line 507 to modify the address in address generator 503 in order to read the control field of the next control segment. Again, bit B1 is scanned for first. Assuming a control field is found where bit B1 is off and bit B0 is on, this is indicative of the fact that page turn-in is required. Again the bulk address must be generated for the SCU. It will be recalled that for page turn-in, the apparent address indicative of the desired data was stored in register A1 which is ultimately stored in the A1 field of the control segment. Therefore, the contents of the A1 field of the control segment are read into register 511, and sent via buss 520 to address generator 521. Address generator 521 decodes this AAH into a bulk address including both record address and access arm for the case in which bulk store is a disc storage. Upon completion of this operation, the control field in register 509 and the bulk address in register 513 are read via buss 73 to their respective fields in the present control segment, and the SCU is signalled via line 114 that its services are needed.

PTC Reverse Operation

It can be assumed for the moment that the SCU has completed its task of page turnout. As will be made clear in the subsequent discussion in the SCU section of this application, the SCU performs only one function at a time, either page turnout or page turn-in, and then sets bit B4 on in the control field, indicating that the SCU has completed service. However, it may occur that both page turnout and page turn-in are required, in which event after completion of page turnout the SCU will turn control back to the PTC with the function of page turn-in still required to be performed. For this reason, when control is turned back to PTC from the SCU, the PTC checks to see if both bit B4 and B0 are on. This indicates that the SCU has completed page turnout but that page turn-in is still required. If B4 is on and both B1 and B0 are off, no further paging is required and true reverse PTC action is required as will be described.

After the SCU finishes a task, it sets latch 35 via line 47 and this signals the PTC over line 149 of possible reverse action. The PTC resets address generator 503, if not busy, and will read each control field from each segment until a control field is found which requires service. Assume that a B4 bit and a B0 bit are found on. This indicates that the SCU has completed page turnout and has set B4 on indicating it has finished service. However, finding bit B4 on, the PTC determines from B0 that a page turn-in is yet to be performed by the SCU. It is now required that the bulk address from which the page of data is to be turned in to the high speed storage be generated by the PTC. The PTC reads the AAH from the A1 field of the current control segment into register 511. The bulk address is generated in address generator 521 from the information in register 511, and is fed into register 513. B4 is turned off. The registers 509, 511, and 513 are then read back to their respective fields in the current control segment via buss 73. PTC cycle control 501 signals the SCU by sending a signal over line 114 to set latch 33. This indicates to The SCU to take control for ultimate page turn-in.

If, however, after being signalled over line 149, the PTC scans control fields of the control segments and finds a control field with bit B4 on and Bit B0 off, this indicates that the SCU is completely finished with service and the PTC must indicate to the CBC that page turn-in is complete. The PTC must also supply the CBC with the proper control information in the control registers of the IR to allow the CBC to update the CB map and the IR map. Inasmuch as the PTC has the control field of the affected block's control segment in register 509, and PTC causes fields A1 through A2 of the present segment to be read into the control registers of the IR. Control is turned over to the CBC for reverse operation by a signal from PTC cycle control 501 over line 133 to set latch 29.

Storage Control Unit — Subsystem Structure

The storage control unit (SCU) is seen generally in FIG. 7. As seen in FIG. 7 line 114 from the PTC is connected to the set side of the latch 33. Line 143 is connected from latch 33 to SCU cycle control 701. Buss 65 proceeds from SCU cycle control to the PAH buss 67 seen in FIG. 2. Also connected to the SCU cycle control 701, via line 700 and 702, is address generator 703. Connected to address generated 703 via buss 707 is address modifier 705. Address modifier 705 is controlled over line 709 from the SCU cycle control 701. Address modifier 705 and address generator 703 are similar to address modifier 505 and address generator 503 in FIG. 6. Address generator 703 is connected to PAL buss 708 via buss 75. SCU cycle control is connected to CONTROL and SCAN LOGIC 713 via buss 723. Control line 705 connects CONTROL and SCAN LOGIC 713 to SCU cycle control. CONTROL and SCAN LOGIC 713 will be seen in detail in FIG. 7*a*. Also seen in FIG. 7 is bulk store 1. Bulk store may be any well known type storage device such as a disc storage. Communication lines 729, 731 connect bulk store 1 to SCU cycle control 701. Address buss 717 connects cycle and scan logic 713 to bulk store 1. Control line 727 is connected between bulk store 1 and CONTROL and SCAN LOGIC 713. Buffer 711 is connected to the DBI register via buss 75. Buss 91 is connected from DBO register to the buffer 711. Buffer 711 may be any well known type storage such a core storage or the like. It is generally divided into fields, three of which are indicated generally at 710, 712, 714. Field 710 is reserved for the control field of a given control segment. Field 712 is reserved for bulk address generated by the PTC and stored by it in the bulk field of the control segment of the affected row. Field 714 is reserved for the D address from the D field of the control segment. Data is transferred from buffer to the bulk storage via buss 721, and from the bulk storage to the buffer via buss 719. Latch 35 is provided for communication between PTC and the SCU over line 149. Latch 35 is set by the SCU cycle control over line 147. Line 151 resets latch 35 from the PTC cycle control.

Line 737 from bulk store 1 to CONTROL and SCAN LOGIC 713 provides an indication whenever a given access mechanism of the bulk store is busy reading or writing data. In general, a read or write command includes a seek command, in the case of disc storage, for positioning the read and write head over the proper data track prior to reading or writing data. The commands for read and write are sent from CONTROL and SCAN LOGIC 713 to the bulk store over lines 739 and 741, respectively.

CONTROL and SCAN LOGIC 713 is seen in detail in FIG. 7A. Register 802, register 804, and register 806 are provided for receiving the control field, bulk address, and D address, respectively from the buffer 711.

The purpose of control and scan logic 713 is to scan the control field of a control segment for a given row and to determine whether a turn-in or a turnout is required, and to determine the bulk address and core block address involved. Register 804 contains the bulk store address into which a turned-out core block is to be written, or from which a page to be turned-in is to be read. The bulk address includes both an access mechanism address on line 718, in the case of a multiple access disc bulk storage; and a record address on buss 720. The access mechanism address allows activation of a given access for seeking a certain record indicated in the record address. If the access mechanism involved is not busy servicing another control segment then the proper command, — i.e., seek-write over line 741 for turnout, and seek-read over line 739 for turn-in — can be issued to the bulk store.

Register 806 contains the D field of the control segment of the affected core block. It will be recalled that the D field contains the core block address in PAH form. If the control field scanned indicates that SCU service is required, the D field will be read over buss 65 to the PAH register to be used for accessing the core block to or from which data will be turned-in or turned-out.

With continued reference to FIG. 7A, line 737 is connected from bulk storage 1 to AND gate 863. There will, in general, be one line 737 for each access mechanism. Line 718, indicative of the access mechanism address, is also an input to gate 863. The output of gate 863 indicates that the address access mechanism is busy, and is connected via line 867 to line 725. The output of gate 863 is also connected to inverter 865 which in turn is connected by line 869 to AND gates 859 and 861. The output of inverter 865, if on, indicates the desired access is not busy, and is an enabling signal for the command to be issued over lines 739 and 741. Line 727 is connected from bulk store 1 to set bit B4 of the control field. A signal over line 727 is an indication from the bulk store that reading or writing is complete, and sets B4 indicating SCU service is completed.

Line 842 connects bit B1 to AND gate 859. B1 indicates turnout is required. Bit B1 is also connected to inverter 846. The output of inverter 846 is connected as one input to AND gate 848. The second input to gate 848 is supplied from bit B0 via line 841. The output of gate 848 over line 857 indicates turn-in is required. Line 857 is connected as a second input of gate 861. B1 and B0 serve as inputs to OR gate 851. The output of OR gate 851 is connected over line 853 to inverter 855. The output of inverter 855 is connected to line 725. Line 845 is connected from the output of AND gate 859, which output is an indication of required turnout, to the reset side of bit B1. This turns off the turnout bit in the control field once the seek-write command is given to bulk storage to perform turnout. Likewise, line 843 is connected from the output of AND gate 861, which output is an indication of required turn-in, to the reset side of B0. This turns off the turn-in bit in the control field once the seek-read command is given to bulk storage to perform turn-in.

Storage Control Unit — Subsystem Operation

Referring to FIG. 7, when turnout or turn-in is required, the PTC sets latch 33 via line 114. This sends a signal over line 143 to SCU cycle control 701. SCU cycle control 701 then causes address generator 703 to read out the control field, the bulk field and the D field of the first control segment to buffer 711. The control field will be scanned for the presence of bit B1. If B1 is not present, the B0 bit is tested for. If neither B1 nor B0 is on, the control segment does not require service, and the address of address generator 703 is modified by modifier 705, and the same fields of the next control segment are read into buffer 711 and the control field is again scanned.

Scanning of the control field to determine whether service is required for a control segment is performed in control and scan logic 713, seen in detail in FIG. 7A. When the control, bulk and D fields were read out of a given control segment to buffer 711, they were also read into registers 802, 804 and 806, respectively. Bits B1 and B0 are initially connected to OR gate 851. If neither bit is on, the particular segment whose control segment is being scanned does not need service. Therefore there is an absence of a signal over line 853, and a signal out of inverter 855 to line 725 causes SCU cycle control to read the control, bulk and D fields of the next segment into buffer 711 and to registers 802, 804 and 806. Assuming one or both of bits B1 and B0 are on, OR gate 851 emits a signal to prevent an advance signal to be transmitted over line 725.

SCU Operation for Turn-in, Bit B0 On, Bit B1 Off

It will be recalled that when the CBC allocated a core block for page turn-in, bit B0 only was set on in the control field of the affected control segment, via the C1 register. When scanning the control field, line 842 connects bit B1 to gate 859. Since B0 is assumed on and B1 off, the gate 859 will be disabled. However, the absence of a signal on line 842 causes a signal at the output of inverter 846 to condition AND gate 848. Bit B0 being on, a signal over line 841 passes through conditioned AND gate 848 and causes a signal over line 857. This signal over line 857 indicates that turn-in, or data readin, is required, if the access mechanism over which the data is to be read is not busy servicing another control segment. The bulk address in register 804 includes the address on the record which contains the desired data, as well as the access mechanism which can reach that record. This information is presented to the bulk storage over buss 720 and line 718, respectively. If the desired access mechanism is busy a signal over line 737 causes a signal out of AND gate 863. If the access is busy the control segment must be presented for service at a later time. Thus a signal over line 867 to line 725 causes the next control segment to be read out and checked for service requirements. If, however, the desired access mechanism is not busy, there will be an absence of a signal from gate 863, which causes a signal from inverter 865 to condition AND gate 861 to issue a SEEK-READ command over line 739. Concurrently a signal over line 843 will reset bit B0.

When the SEEK-READ command is sent over line 739 the desired data will be read to buffer 711 of FIG. 7. From the buffer, the data is read to the core block designated by the D field in register 806 under control of buss sharing controls 93. When reading from the bulk store is complete, a signal over line 727 sets bit B4, indicative of completion of service. This also causes a signal over line 726 to signal the SCU cycle control to set latch 35 over line 147 to return control to the PTC.

SCU Operation for TurnOut Followed by Turn-In, Bits B0 and B1 On

It will be recalled that when the CBC reallocated a core block, turnout followed by turn-in was required. For this situation the CBC set on bits B1 (TurnOut) and B0 (Turn-In) in the control field of the control segment associated with the affected core block. When the PTC signals the SCU over line 114 that service is required, the control field of each control segment is successively scanned. If both bits B0 and B1 are on, operation proceeds as follows for the affected control segment. Referring to FIG. 7A, line 842 connects bit B1 to gate 859. Since B1 is on, gate 859 is conditioned and gate 848 is deconditioned via inverter 846, thus deconditioning the SEEK-READ command via gate 861. Assuming the desired access mechanism is not busy, gate 859 will receive a signal over line 869 to send the SEEK-WRITE command over line 741 to the bulk store and reset B1 over line 845. The data is read from the high speed store core block to the buffer via the DBO register, under control of the PAH in the D field in register 806, and written in bulk store over buss 721.

It will be recalled from the discussion of the PTC operation that the SCU performs only one function (turnout or turn-in) at a time and then signals the PTC that the SCU has 91 service. In the case of turnout followed by turn-in, (bits B0 and B1 both on) turnout only will be performed, in a manner described immediately above. When the affected core block of data has been turned-out, a complete signal over line 727 sets bit B4 and line 726 causes the SCU to set latch 35 over line 147.

Thereafter the PTC, when scanning the control field of each segment, will discover bits B4 and B0 on in the control field of the segment whose core block was just turned-out. This will signify to the PTC that the SCU has just finished service (B4 on) but that turn-in is still required (B0 on). Hence, as described in the discussion of the PTC subsystem, the B4 bit will be turned off and the SCU will be again signaled over line 114, and turn-in will be performed as described in the previous section.

Operation Summary

The following is a summary of operation. The case in which a successful Immediate Access Cycle provides the requested data is adequately discussed in the Immediate Access section of this application. Also, the case in which an unsuccessful Immediate Access Cycle is followed by a successful IR cycle which provides the desired data is also adequately discussed in the IR case 1 section. Hence, only a summary of Allocation and Reallocation will be given at this point.

Allocation

For the situation in which an unsuccessful IA cycle in followed by an unsuccessful IR cycle, IR Case 2 results. A CBC cycle is initiated and if an F bit is found on, CBC Case 1, or allocation results. This indicates that the desired page of data will be read, or turned-in, from bulk store to the allocated core block. Therefore, the CBC sets bit B0 only on in the control field and signalled the PTC. The PTC detects that only bit B0 is on and sets up control information as indicated in PTC Forward Operation, Page Turn-In section. The SCU is then signalled and detects bit B0 on. SCU operation proceeds as in the SCU operation for Turn-In, Bit B0 On, Bit B1 Off section. When page turn-in is complete the SCU stores the control information and signals the PTC via latch 35. The PTC goes into reverse operation and scans the control segments. When the PTC finds the segment having control field bits B0 and B1 off and B4 on it sets B7 on indicating it has finished service and signals the CBC. The CBC initiates reverse operation, locates the control segment with B7 on, turns B7 off and turns B5 on to indicate it has finished service. It then operates the IR and CBC maps as explained in the CBC Reverse Operation section. A signal over line 263 sets latch 256 in FIG. 3 to send the issuing CPU a proceed signal over line 110. The next time the AAH is presented, a successful IR cycle will provide the requested data.

Reallocation

For the situation in which an unsuccessful IA cycle is followed by an unsuccessful IR cycle, IR Case 2 results. A CBC cycle is initiated and if no F bit is found on, CBC Case 2 results. This indicates that the core block having its N bit on in the CB map is to be reallocated. That is, the data in the core block for the N-bit 71 is turned-out to bulk store, and the desired data is turned-in from bulk store to that core block. Thus, turnout followed by turn-in is required and the CBC sets both bits B0 and B1 on in the control field and signals the PTC. The PTC goes into operation as described in PTC Forward Operation-Page TurnOut section. The SCU is signalled and operation proceeds as in the SCU Operation For TurnOut Followed By Turn-In, Bits B0 And B1 On section. When the SCU has completed turnout, it turns off bit B1, leaving B0 on, and turns on B4. Turn-in is yet to be performed. The SCU then signals the PTC. The PTC scans the control segments and when it finds the control field having both B4 on and B0 on it proceeds as described in the Page Turn-In section and signals the SCU. The SCU again scans the control segments. When the SCU finds a control field having B0 on and B1 off, it turns-in the page of data as described in the SCU Operation For Turn-In, Bit B0 On, Bit B1 Off section. When the SCU has finished turn-in of the desired data to the reallocated core block, it turns off bit B1 and turns on bit B4 and signals the PTC. The PTC goes into operation as described in the PTC Reverse Operation section, culminating in signalling the CBC. The CBC proceeds as in the CBC Reverse Operation section and updates the IR and CB maps. The issuing CPU is then signalled over line 110 to proceed. The next time the AAH is presented, a successful IR cycle will provide the desired data.

While the invention has been particularly shown and described with reference to a preferred embodiment thereof, it will be understood by those skilled in the art that various changes in form and details may be made therein without departing from the spirit and scope of the invention.

We claim:

1. A data storage system comprising, in combination:

system storage means, said system storage means including a first storage for storing system data, coupled to a high-speed storage against which said system data is processed, said high-speed storage being faster and of smaller capacity than said first storage;

an input for receiving requests to access data entities in said high-speed storage in terms of logical address names; and control means coupling said input to said system storage means, said control means including randomizing translation means for translating said symbolic address names into physical addresses with which to address said high-speed storage.

2. The combination of claim 1 wherein said translation means includes:

posting means divided into addressable entities, for posting at least a portion of the physical address corresponding to the symbolic address name of each data entity which is currently resident in each high-speed storage;

randomizing means coupled to said posting means and to said input for generating from at least part of each incoming symbolic address name an address for accessing said posting means at an addressable entity wherein said at least a portion of the physical address corresponding to the incoming symbolic address name is probabilistically expected to be posted;

interrogation means connected to said posting means and coupled to said input for interrogating said posting means to determine whether said data entity designated by said incoming symbolic address name is resident in said high-speed storage; and gating means connected to said posting means and responsive to a successful determination by said interrogation means for gating said at least a portion of said physical address out of said posting means for use in accessing said high-speed storage.

3. The combination of claim 2 wherein said interrogation means comprises a plurality of comparators for interrogating individual ones of said addressable entities of said posting means.

4. The combination of claim 3 wherein said posting means includes a plurality of overflow indicators, associated with said addressable entities of said posting means, for indicating that said at least a portion of the physical address has overflowed the addressable entity where it was probabilistically expected to be posted.

5. The combination of claim 4 wherein said posting means further includes a plurality of overflow addresses, associated with said addressable entities of said posting means, for indicating the addressable entity to which said at least a portion of the physical address has overflowed.

6. The combination of claim 5 including gating means coupled to said posting means, responsive to an unsuccessful determination by said interrogation means and to an associated overflow indicator, for causing said posting means to be interrogated by said interrogation means at an associated overflow address.

7. The combination of claim 2 wherein said translation means further includes a comparison subsystem coupled to said input and to said posting means for providing at least a portion of said physical address with which to access said high-speed storage, in response to an incoming request if the data entity to which said request refers has recently been accessed from said high-speed storage.

8. The combination of claim 7 wherein said comparison subsystem comprises:

a plurality of register pairs, the first register in each said plurality of register pairs containing at least a portion of a symbolic address name which recently resulted in a successful interrogation of said posting means and the second register in each said plurality of register pairs containing the resulting said at least a portion of the physical address corresponding to said symbolic address name;

a plurality of comparison means connected to said input and to said first register in each of said plurality of register pairs, for comparing said incoming symbolic address name with the contents of said first register; and gating means connected to each of said second registers and to said comparison means, for gating said at least a portion of the physical address for use in accessing said high-speed storage, in response to a successful comparison by one of said plurality of comparison means.

9. The combination of claim 2 further including an interstorage transfer mechanism coupled to said posting means and to said storage means, and responsive to an unsuccessful determination by said interrogation means for transferring data between said first storage means and said high-speed storage.

10. The combination of claim 9 wherein said interstorage transfer mechanism includes:

directing means, coupled to said posting means for detecting a free or a specified occupied one of said physical addresses in said high-speed storage;

page turn control means coupled to said directing means, for setting up control information to be used in controlling the transfer of data between said first storage and said high-speed storage; and storage control means coupled to said page turn control means, for controlling the transfer of data between said first storage and said free or specified occupied one of said physical addresses in said high-speed storage.

11. A data storage system for supplying data at an output in response to a request for that data at an input wherein said request includes an address interpreted as logically specifying the desired data, said address having a high order address portion and a low order address portion, said high order address portion specifying the address of a desired block of data and said low order address portion specifying the desired unit of data within said specified block, comprising in combination:

a first data storage means divided into a plurality of addressable data block storage areas;

a high-speed storage means, coupled to said first data storage means, faster and of smaller capacity than said first data storage means, and divided into a plurality of data block storage areas;

posting means divided into addressable entities, for posting information relative to the block address of each block presently stored in said high-speed storage means;

address generation means connected to said input for generating from said requests addresses of said addressable entities of said posting means;

selection means connected to said address generation means and to said posting means, responsive to said generated addresses for accessing said posted information from said addressable entities in said posting means;

comparison means connected to said input and to said posting means for comparing said high order address portion of each request to said accessed posted information;

gating means connected to said comparison means and to said posting means, responsive to a successful comparison for selecting a portion of said posted information relative to the block address corresponding to said request, to access from said high-speed storage said data specified by said record address portion of said request.

12. The combination of claim 11 further including:

signalling means coupled to said posting means and responsive to a nonsuccessful comparison, for supplying a predetermined signal at said output, said signal requesting that said data request be resubmitted at a later time;

directing means coupled to said posting means and responsive to a nonsuccessful comparison for monitoring said high-speed storage to detect a free or specified occupied one of said block data storage areas;

data transmission means coupled to said directing means and to said first storage and said high-speed storage for reading or writing said desired block of data into or from said free or specified occupied one of said block data storage areas of said high-speed storage detected by said directing means, said reading means including control information generation means and means for controlling said first storage means.

13. The data storage system of claim 11 including comparison subsystem means connected to said input and coupled to said posting means for providing a high-speed storage address containing the data indicated by said request when said high order address portion of said request is known to be immediately accessible in said high-speed storage means.

14. The combination of claim 11 wherein said posted information in said plurality of addressable entities comprises first information fields indicative of said high order portions of said request addresses of said blocks presently stored in said high-speed storage and second information fields, each respectively associated with one of said first information fields, said second information fields containing information indicating at least a portion of the address of one of said data storage areas of said high-speed storage means.

15. The combination of claim 11 wherein said plurality of addressable entities each further contain storage means for storing control information indicating the occupancy status of said first and second information fields.

16. The combination of claim 11 wherein said posting means further includes a plurality of control registers for receiving said control information, the contents of said control registers being storable in a specified area of said high-speed storage means.

17. The combination of claim 12 wherein said directing means comprises cycling means responsive to a nonsuccessful comparison; storage areas including status information fields indicative of the occupancy status of each of said plurality of addressable block data storage areas in said high-speed storage means; selection means connected to said storage areas; ring counter means driven by said cycling means and connected to said selection means for causing said selection means to sequentially select individual ones of said status information fields; scanning means responsive to said selected status information fields to detect a free or a specified occupied one of said storage areas; and control register means for indicating whether data is read from or written into said detected data storage areas.

18. The combination of claim 12 wherein said control information generation means comprises first address generation means for generating addresses used to address said control information stored in said specified area of said high-speed storage means; a plurality of storage registers for receiving said control information; means for scanning at least one of said plurality of storage registers to provide a signal indicating that service is required for one of said detected storage areas; second address generation means responsive to said indicating signal to generate from said control information an address in said first data storage means from or to which data is to be transmitted; and data bussing means for storing said control information in said specified area of said high-speed storage.

19. The combination of claim 12 wherein said means for controlling said first data storage means comprises buffer storage means; address generation means for addressing said control information and said generated address of said first data storage means stored in said specific area of said high-speed storage; and logic means for controlling the transmission of data to or from the block data storage area of said first data storage means, indicated by said last named generated address; and data bussing means for transmitting said control information for storage back into said specified area of said high-speed storage means.